US 6,483,427 B1

(12) United States Patent
Werb

(10) Patent No.: US 6,483,427 B1
(45) Date of Patent: *Nov. 19, 2002

(54) ARTICLE TRACKING SYSTEM

(75) Inventor: Jay Werb, Newton, MA (US)

(73) Assignee: RF Technologies, Inc., Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/522,128

(22) Filed: Mar. 9, 2000

Related U.S. Application Data

(63) Continuation of application No. 08/953,755, filed on Oct. 17, 1997, now Pat. No. 6,150,921.
(60) Provisional application No. 60/028,658, filed on Oct. 17, 1996, provisional application No. 60/044,321, filed on Apr. 24, 1997, and provisional application No. 60/044,245, filed on Apr. 24, 1997.

(51) Int. Cl.⁷ ................................................ H04Q 5/22

(52) U.S. Cl. .................... 340/10.1; 340/5.8; 340/573.1; 340/573.4; 340/825.49; 342/42; 342/44

(58) Field of Search ........................... 340/10.1, 5.8, 340/573.1, 573.4, 825.49; 342/42, 44

(56) References Cited

U.S. PATENT DOCUMENTS

| 31,375 | A | 2/1861 | Dodworth |
| 3,098,971 | A | 7/1963 | Richardson .................. 325/9 |
| 3,273,146 | A | 9/1966 | Hurwitz, Jr. ................ 343/6.8 |
| 3,289,114 | A | 11/1966 | Rowen ........................ 333/30 |
| 3,478,344 | A | 11/1969 | Schwitzgebel et al. ..... 340/312 |
| 3,706,094 | A | 12/1972 | Cole et al. .............. 343/6.5 SS |
| 3,707,711 | A | 12/1972 | Cole et al. .................. 340/280 |
| 3,740,742 | A | 6/1973 | Thompson et al. ......... 340/280 |

(List continued on next page.)

FOREIGN PATENT DOCUMENTS

| EP | 0 389 325 A1 | 3/1989 | ........... G01S/13/84 |
| EP | 0 467 036 A2 | 6/1990 | ........... G01S/13/74 |
| EP | 0 779 520 A2 | 6/1997 | ........... G01S/13/82 |

(List continued on next page.)

OTHER PUBLICATIONS

Takeshi Manabe, IEEE Transactions on Antenna and Propagation 40(5):500–509 (1992).
Olivier, RFID–A Practical Solution for Problems You Didn't Even Know You Had?, Texas Instruments Ltd., The Institution of Electrical Engineering, London, UK, (1996).
Williamson et al., IEEE, pp. 186–201 (1993).
Plessky et al., IEEE pp. 117–120 (1995).
Standard Dictionary of Electrical Electronics Terms, An American National Standard, Fourth Edition pp. 663 and 1040 (1988).
Hurst, "Quiktrak: A Unique New AVL System", Proceedings of the Vehicle Navigation and Information Systems Conference, Toronto, pp. A60–A62 (1989).
Internet reference address http://www.tagmaster.se/products/index.htm, , TagMAster Mark Tag™ S1255.

Primary Examiner—Michael Horabik
Assistant Examiner—Yves Dalencourt
(74) Attorney, Agent, or Firm—Wolf, Greenfield & Sacks, P.C.

(57) ABSTRACT

System for tracking mobile tags. Cell controllers with multiple antenna modules generate a carrier signal which is received by the tags. Tags shift the frequency of the carrier signal, modulate an identification code onto it, and transmit the resulting tag signal at randomized intervals. The antennas receive and process the response, and determine the presence of the tags by proximity and triangulation. Distance of a tag from an antenna is calculated by measuring the round trip signal time. The cell controllers send data from the antenna to a host computer. The host computer collects the data and resolves them into positional estimates. Data are archived in a data warehouse, such as an SQL Server.

71 Claims, 17 Drawing Sheets

U.S. PATENT DOCUMENTS

| | | | |
|---|---|---|---|
| 3,805,265 A | 4/1974 | Lester ..................... 343/6.5 R |
| 3,914,762 A | 10/1975 | Klensch ................. 343/6.5 SS |
| 3,944,928 A | 3/1976 | Augenblick et al. .......... 325/65 |
| 3,964,024 A | 6/1976 | Hutton et al. ............ 340/152 T |
| 3,973,200 A | 8/1976 | Akerberg ..................... 325/55 |
| 4,019,181 A | 4/1977 | Olsson et al. ........... 343/6.5 SS |
| 4,075,632 A | 2/1978 | Baldwin et al. .......... 343/6.8 R |
| 4,114,151 A | 9/1978 | Denne et al. ........... 343/6.8 LC |
| 4,314,373 A | 2/1982 | Sellers ........................ 455/73 |
| 4,347,501 A | 8/1982 | Akerberg .................... 340/539 |
| 4,364,043 A | 12/1982 | Cole et al. ............. 340/825.54 |
| 4,399,437 A | 8/1983 | Falck et al. ............ 340/825.54 |
| 4,459,474 A | 7/1984 | Walton ....................... 235/380 |
| 4,471,345 A | 9/1984 | Barrett, Jr. .................. 340/572 |
| 4,481,428 A | 11/1984 | Charlot, Jr. .............. 307/219.1 |
| 4,494,119 A | 1/1985 | Wimbush .................... 343/457 |
| 4,495,496 A | 1/1985 | Miller, III ............. 340/825.54 |
| 4,549,169 A | 10/1985 | Moura et al. ................ 340/539 |
| 4,549,264 A | 10/1985 | Carroll et al. ............... 364/406 |
| 4,598,275 A | 7/1986 | Ross et al. ................... 340/573 |
| 4,605,929 A | 8/1986 | Skeie ..................... 343/6.8 R |
| 4,613,864 A | 9/1986 | Hofgen ....................... 343/357 |
| 4,625,207 A | 11/1986 | Skeie .......................... 342/51 |
| 4,636,950 A | 1/1987 | Caswell et al. .............. 364/403 |
| 4,651,156 A | 3/1987 | Martinez ..................... 342/457 |
| 4,656,463 A | 4/1987 | Anders et al. ............... 340/572 |
| 4,658,357 A | 4/1987 | Carroll et al. ............... 364/406 |
| 4,691,202 A | 9/1987 | Denne et al. ........... 340/825.54 |
| 4,703,327 A | 10/1987 | Rossetti et al. ............... 342/44 |
| 4,724,427 A | 2/1988 | Carroll ........................ 340/572 |
| 4,725,841 A | 2/1988 | Nysen et al. ................. 342/44 |
| 4,746,830 A | 5/1988 | Holland ....................... 310/313 |
| 4,757,315 A | 7/1988 | Lichtenberg et al. ........ 342/125 |
| 4,777,478 A | 10/1988 | Hirsch et al. ................ 340/573 |
| 4,786,907 A | 11/1988 | Koelle ......................... 342/51 |
| 4,799,062 A | 1/1989 | Sanderford, Jr. et al. ... 342/450 |
| 4,814,751 A | 3/1989 | Hawkins et al. ............. 340/573 |
| 4,818,855 A | 4/1989 | Mongeon et al. ........... 235/440 |
| 4,818,998 A | 4/1989 | Apsell et al. ................. 342/44 |
| 4,819,267 A | 4/1989 | Cargile et al. ................ 380/23 |
| 4,862,176 A | 8/1989 | Voles .......................... 342/45 |
| 4,888,473 A | 12/1989 | Rossi et al. .................. 235/376 |
| 4,888,692 A | 12/1989 | Gupta et al. ................. 364/402 |
| 4,897,661 A | 1/1990 | Hiraiwa ...................... 342/457 |
| 4,918,423 A | 4/1990 | Fukuyama et al. .......... 340/442 |
| 4,918,425 A | 4/1990 | Greenberg et al. ........... 340/539 |
| 4,918,493 A | 4/1990 | Geissberger et al. ............ 357/4 |
| 4,924,211 A | 5/1990 | Davies ....................... 340/573 |
| 4,952,913 A | 8/1990 | Pauley et al. ................ 340/573 |
| 5,025,492 A | 6/1991 | Viereck ....................... 342/144 |
| 5,053,774 A | 10/1991 | Schuermann et al. ......... 342/44 |
| 5,062,151 A | 10/1991 | Shipley ....................... 359/154 |
| 5,073,781 A | 12/1991 | Stickelbrocks ............... 342/51 |
| 5,095,240 A | 3/1992 | Nysen et al. ............ 310/313 R |
| 5,099,227 A | 3/1992 | Geiszler et al. .............. 340/572 |
| 5,119,104 A | 6/1992 | Heller ......................... 342/450 |
| 5,126,746 A | 6/1992 | Gritton ........................ 342/125 |
| 5,144,313 A | 9/1992 | Kirknes ....................... 342/44 |
| 5,163,004 A | 11/1992 | Rentz ......................... 364/460 |
| 5,164,985 A | 11/1992 | Nysen et al. ................... 380/9 |
| 5,194,860 A | 3/1993 | Jones et al. ............. 340/370.02 |
| 5,208,756 A | 5/1993 | Song .......................... 364/449 |
| 5,216,612 A | 6/1993 | Cornett et al. ............... 364/468 |
| 5,218,344 A | 6/1993 | Ricketts ...................... 340/573 |
| 5,221,831 A | 6/1993 | Geiszler ...................... 235/440 |
| 5,222,099 A | 6/1993 | Hori et al. ..................... 375/1 |
| 5,224,034 A | 6/1993 | Katz et al. ................... 364/401 |
| 5,249,120 A | 9/1993 | Foley ......................... 364/401 |
| 5,252,979 A | 10/1993 | Nysen ......................... 342/50 |
| 5,262,784 A | 11/1993 | Drobnicki et al. ............. 342/45 |
| 5,276,496 A | 1/1994 | Heller et al. ................. 356/141 |
| 5,287,112 A | 2/1994 | Schuermann ................. 342/42 |
| 5,289,372 A | 2/1994 | Guthrie et al. ............... 364/403 |
| 5,294,931 A | 3/1994 | Meier .......................... 342/44 |
| 5,311,185 A | 5/1994 | Hochstein et al. ............. 342/44 |
| 5,311,438 A | 5/1994 | Sellers et al. ................ 364/468 |
| 5,311,562 A | 5/1994 | Palusamy et al. ............. 376/215 |
| 5,317,309 A | 5/1994 | Vercellotti et al. ...... 340/825.54 |
| 5,321,605 A | 6/1994 | Chapman et al. ............. 364/402 |
| 5,331,545 A | 7/1994 | Yajima et al. ............... 364/401 |
| 5,343,387 A | 8/1994 | Honma et al. ............... 364/401 |
| 5,355,137 A | 10/1994 | Schuermann ................. 342/42 |
| 5,359,250 A | 10/1994 | Toda ....................... 310/313 R |
| 5,359,322 A | 10/1994 | Murray .................. 340/825.31 |
| 5,365,516 A | 11/1994 | Jandrell ........................ 370/18 |
| 5,369,570 A | 11/1994 | Parad ......................... 364/401 |
| 5,382,784 A | 1/1995 | Eberhardt ................... 235/472 |
| 5,420,883 A | 5/1995 | Swensen et al. ............ 375/200 |
| 5,424,746 A | 6/1995 | Schwab et al. ................ 342/49 |
| 5,426,284 A | 6/1995 | Doyle ......................... 235/385 |
| 5,428,547 A | 6/1995 | Ikeda .................... 364/474.16 |
| 5,430,889 A | 7/1995 | Hulbert et al. ............. 455/33.1 |
| 5,440,301 A | 8/1995 | Evans .................... 340/870.11 |
| 5,448,221 A | 9/1995 | Weller ......................... 340/539 |
| 5,450,492 A | 9/1995 | Hook et al. .................... 380/28 |
| 5,455,409 A | 10/1995 | Smith et al. ................ 235/385 |
| 5,455,851 A | 10/1995 | Chaco et al. ................. 379/38 |
| 5,467,268 A | 11/1995 | Sisley et al. ................. 364/401 |
| 5,469,170 A | 11/1995 | Mariani ........................ 342/51 |
| 5,471,404 A | 11/1995 | Mazer ......................... 364/516 |
| 5,477,225 A | 12/1995 | Young et al. .................. 342/46 |
| 5,499,071 A | 3/1996 | Wakabayashi et al. ... 354/173.1 |
| 5,504,936 A | 4/1996 | Lee ........................... 455/33.2 |
| 5,506,584 A | 4/1996 | Boles .......................... 342/42 |
| 5,506,864 A | 4/1996 | Schilling .................... 375/205 |
| 5,517,194 A | 5/1996 | Carroll et al. ................. 342/50 |
| 5,521,602 A | 5/1996 | Carroll et al. ................. 342/50 |
| 5,526,357 A | 6/1996 | Jandrell ..................... 370/95.2 |
| 5,528,232 A | 6/1996 | Verma et al. ........... 340/825.54 |
| 5,539,394 A | 7/1996 | Cato et al. ............. 340/825.54 |
| 5,539,775 A | 7/1996 | Tuttle et al. ................ 375/200 |
| 5,550,547 A | 8/1996 | Chan et al. ................... 342/42 |
| 5,552,772 A | 9/1996 | Janky et al. ................. 340/573 |
| 5,552,790 A | 9/1996 | Gunnarsson .................. 342/51 |
| 5,565,858 A | 10/1996 | Guthrie .................. 340/825.35 |
| 5,581,486 A | 12/1996 | Terada et al. ................ 364/569 |
| 5,586,057 A | 12/1996 | Patel ...................... 364/551.01 |
| 5,592,180 A | 1/1997 | Yokev et al. ................ 342/450 |
| 5,596,507 A | 1/1997 | Jones et al. ................. 364/505 |
| 5,602,538 A | 2/1997 | Orthmann et al. ...... 340/825.54 |
| 5,608,621 A | 3/1997 | Caveney et al. ............. 395/216 |
| 5,617,342 A | 4/1997 | Elazouni ..................... 364/578 |
| 5,621,411 A | 4/1997 | Hagl et al. .................... 342/42 |
| 5,621,412 A | 4/1997 | Sharpe et al. ................. 342/51 |
| 5,623,413 A | 4/1997 | Matheson et al. ........... 364/436 |
| 5,630,070 A | 5/1997 | Dietrich et al. .............. 395/208 |
| 5,640,151 A | 6/1997 | Reis et al. .............. 340/825.54 |
| 5,663,956 A | 9/1997 | Schilling .................... 370/335 |
| 5,678,186 A | 10/1997 | Lee ........................... 455/33.2 |
| 5,710,566 A | 1/1998 | Grabow et al. ............. 342/457 |
| 5,714,932 A | 2/1998 | Castellon et al. ............ 340/539 |
| 5,722,059 A | 2/1998 | Campana, Jr. ............ 455/226.2 |
| 5,726,630 A | 3/1998 | Marsh et al. ................ 340/572 |
| 5,731,785 A | 3/1998 | Lemelson et al. ........... 342/357 |

| | | | | | | |
|---|---|---|---|---|---|---|
| 5,774,876 A | 6/1998 | Woolley et al. ............... 705/28 | GB | 2 234 140 | 1/1991 | ........... G01S/13/80 |
| 5,995,017 A | 11/1999 | Marsh et al. .......... 340/825.54 | GB | 2 246 891 | 2/1992 | ............ G08B/2/00 |
| | | | WO | WO92/17947 | 10/1992 | ............ H04B/1/59 |
| | FOREIGN PATENT DOCUMENTS | | WO | WO96/18913 | 6/1996 | ........... G01S/13/84 |
| EP | 0 851 230 A1 | 7/1998 ........... G01S/13/87 | WO | WO 97/49972 | 12/1997 | |

550

I & Q
0

560 abs(d2cor/dt)
0

ARTICLE TRACKING SYSTEM

REFERENCES TO RELATED APPLICATIONS

This application is a Continuation of U.S. application Ser. No. 08/953,755, filed Oct. 17, 1997 now U.S. Pat. No. 6,150,921.

This application claims priority from a provisional application Ser. No. 60/028,658, filed Oct. 17, 1996, a provisional application Ser. No. 60/044,321, filed Apr. 24, 1997, a provisional application Ser. No. 60/044,245, filed Apr. 24, 1997, and a continuation of 08/953,755 filed on Oct. 17, 1997 which is now U.S. Pat. No. 6,150,921.

BACKGROUND OF THE INVENTION

The invention relates to Radio Frequency Identification (RFID) systems and, particularly, to an RFID system designed to continuously track articles and personnel as they move through buildings.

RFID products typically have three components: (1) a tag (the item being identified), (2) an interrogator (a device which detects the presence of a tag), and (3) a system (typically including cabling, computers, and software which tie together the tags and interrogators into a useful solution). RFID products are typically designed to detect tags when they pass within range of a few fixed or handheld interrogators.

RFID systems are usually deployed as high-end replacement technology for bar coding. RFID and related systems include passive RFID systems, active RFID systems, infrared ID systems, and Electronic Article Surveillance (EAS) systems.

The tags in a passive RFID system do not carry on-board power. The interrogator in such systems transmits operating power for the tags. Such systems generally have a detection range of a meter or less, although somewhat longer ranges have been achieved. Typically, these systems operate in the 125-kilohertz radio band.

Most passive RFID systems work as follows. An interrogator emits an electromagnetic field for the purpose of powering the tag. A coil in the tag is powered by the electromagnetic field, causing the tag's circuitry to "wake up." The tag uses this power to send an identifying signal back to the interrogator.

Although most passive RFID systems are read-only (that is, the tags in such system respond to a query by reading information from their memory and sending the information back to the interrogator), the tags used in some passive RFID systems have a limited ability to accept information and instructions from the interrogator, for example read/write capabilities in smart cards (electronic money) and "electronic manifests" in industrial applications.

Passive RFID tags have been employed in conjunction with access control, smart cards, vehicle identification (AVI), waste management, item tracking, animal identification, manufacturing control, materials handling, and a variety of other purposes.

One fundamental design goal of any RFID system is for the weak signal emitted from the tag to be distinguishable from the much stronger signal emitted by the interrogator. Some strategies for doing this include:

Frequency shifting. Circuitry in the tag receives a carrier from the interrogator, translates the signal to another frequency, and emits a response modulated onto that second frequency.

Half duplex operation. The tag is charged by the interrogator. When the interrogator's charging circuit turns off, the tag uses the stored power to respond.

Modulated backscatter. The tag modulates its antenna cross section to identify itself to the interrogator.

Delayed retransmission. Surface acoustic wave (SAW) devices retransmit the interrogator's carrier after a delay. The tag's identity is indicated by time variations in the delayed response.

Active RFID systems require battery-powered tags. The battery permits a longer detection range of between 3 and 100 meters. These systems are capable of locating tags with higher accuracy than passive RFID systems and typically operate in the 400, 900, or 2440 megahertz bands. Active tags tend to enable multiple tags to be within range of an interrogator by the use of "handshaking" between the tags and interrogator, so that each tag transmits its signal in turn. Communication between tag and interrogator in active RFID systems is also typically faster than with passive tags.

Most active RFID tags respond to the interrogator when polled, in accordance with a communications protocol. Some active RFID tags "chirp" (transmit) a signal spontaneously at predetermined intervals. A tag's chirped signal is detected by the interrogator if the tag is in range of the interrogator.

Infrared systems (IRID), while not RFID systems, also endeavor to detect and identify the position of mobile tags. A typical IRID system includes a tag that chirps its identity at randomized intervals. Infrared readers located in the ceiling detect these transmissions, and report them to a host. The transmission rate from the tag to reader is typically about 600 baud. Motion detectors in the tags enable the tags to transmit more frequently when in motion. The tags are typically about the size of dominos.

EAS systems are intended to deter theft in retail environments. EAS tags are fairly unreliable, very low in cost, and limited in capabilities. Although they track mobile tags, they are not generally considered to be RFID products, because EAS tags are uncoded and cannot be distinguished from one another.

SUMMARY OF THE INVENTION

A system for tracking mobile tags includes cell controllers with multiple antenna modules which generate a carrier signal received by the tags. The tags respond by transmitting identification codes at randomized intervals, the codes being modulated onto the carrier signal. The antenna modules located, for example, in the ceiling, receive the responses and send them to a cell controller, which processes them and uses them to calculate tag locations by proximity and triangulation techniques. The distance of a tag from a particular antenna module is calculated by measuring the round trip signal time. The cell controllers send processed data derived from the received signals to a host computer. The host computer collects the data and resolves them into positional estimates. The host computer archives data in a data warehouse, such as an SQL Server.

Among the advantages of the invention are one or more of the following.

One advantage of the invention is that it is designed to remain in constant communication with the tags while covering a complete facility. The system is able to identify and calculate the location of tags even in the presence of severe multipath effects.

Another advantage of the invention is that it uses tags with low power consumption requirements, allowing the lifetime a powered tag to approximate the lifetime of the tag battery itself. Furthermore, tags can enter a low-power mode when not in use, thereby further conserving power.

Another advantage of the invention is that it is scaleable. A small number of widely-spaced antenna modules can be used to roughly locate tags within a facility. If a more accurate tag location is desired, additional antenna modules can easily be added to the system. Furthermore, new tags can be added to the system without requiring any system re-configuration.

Another advantage of the invention is that it mitigates problems caused by the collision of tag signals. Because tags spontaneously wake up and "chirp" on a randomized basis, multiple tags are unlikely to transmit signals simultaneously. Furthermore, in some circumstances the system is able to predict when tag signal collisions will occur and respond accordingly.

Another advantage of the invention is that tags can respond to multiple cell controllers simultaneously.

Other features and advantages of the invention will become apparent from the following description and from the claims.

DETAILED DESCRIPTION

Figure 1:
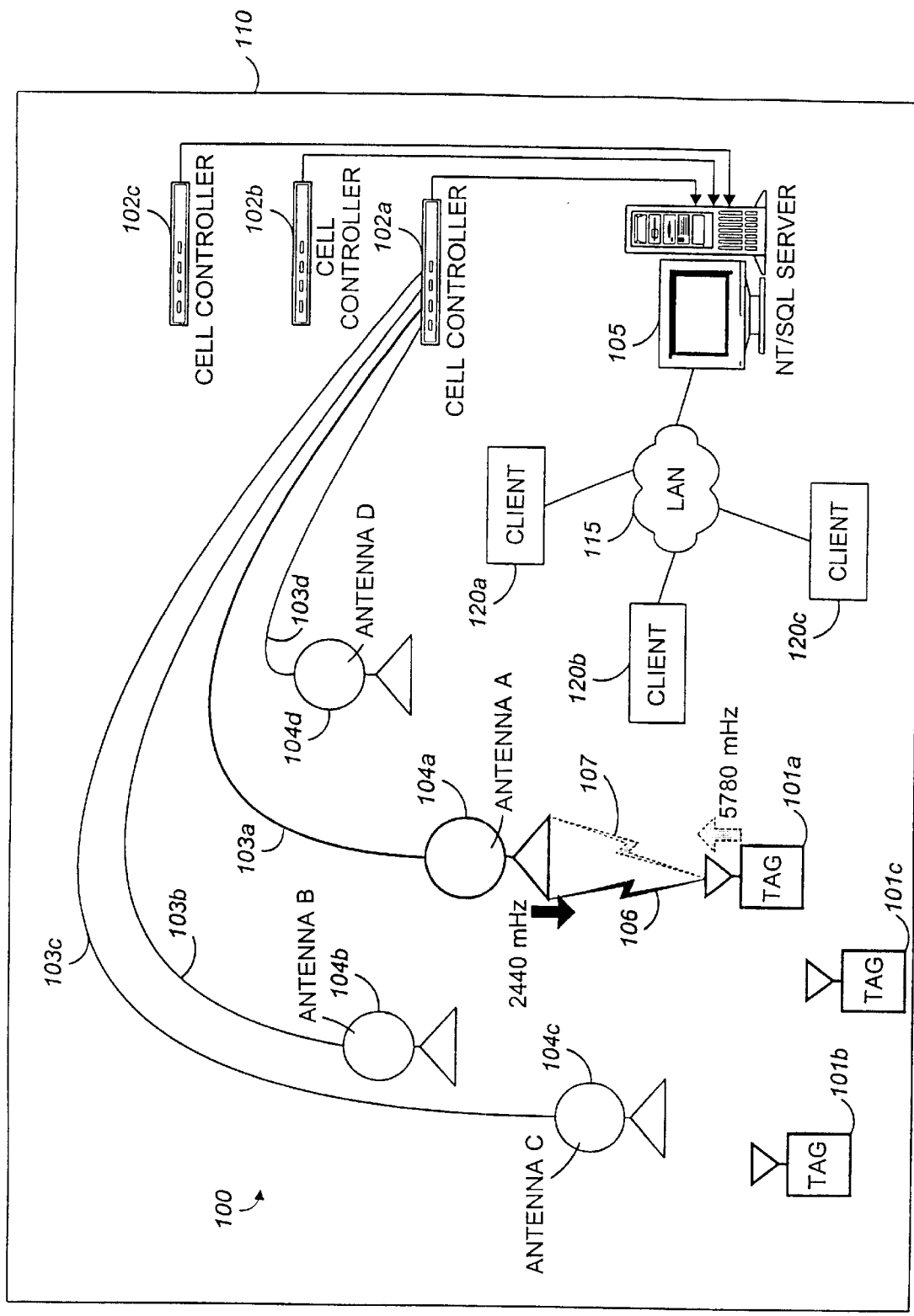
FIG. 1 shows an overview of a system configured according to the invention.

Referring to FIG. 1, an article tracking system 100 contains the following general components:

Tags: Inexpensive miniature radio frequency transponding tags 101a–c are attached to people and/or items being tracked. Tags 101a–c "wake up" periodically, and "chirp" (transmit) a radio-coded unique identity code (UID). The tags 101a–c are designed so that their range is 15–30 meters in a typical indoor environment, the range mostly being limited by a need to conserve the life of the tag battery, and the requirement that the tag 101a and tag battery be small and thin.

Cell Controllers: Cell controllers 102a–c detect the chirps of tags 101a–c and calculate the distances of those tags 101a–c to active antenna modules 104a–d connected to the cell controllers 102a–c. Each antenna module preferably has a transmit antenna and a receive antenna. In FIG. 1, the antenna modules connected to cell controllers 102b and 102c are omitted for simplicity. A cell controller 102a is typically contained in a case and is mounted behind a hung ceiling. The cell controller 102a can receive power from a conventional wall outlet or the equivalent. The cell controller 102a is attached through coaxial cables 103a–d to the antenna modules 104a–d, respectively, which provide coverage of an area of the indoor facility 110. A tag signal 107, transmitted by a tag 101a, is received by one or more antenna modules 104a–d, and is processed by chips in the cell controller 102a, such as digital signal processing (DSP) chips. The information resulting from this processing is used to identify both the identity of the transmitting tag 101a and the distance between the tag 101a and each, for example, of the receiving antenna modules 104a–d.

Host Computer: Cell controllers 102a–c are in data communication with a host computer 105, which collects data and information available from the cell controllers 102a–c and archives the data into an open format database, such as an SQL Server.

User Application: In a preferred option, client workstations 120a–c communicate with the host computer 105 over a network, such as a LAN 115. A client application running on each of the client workstations 120a–c can access the SQL Server and presents the data in a way that is useful to an end-user.

The tag 101a does not generate its own radio signal. Rather, an antenna module, for example antenna module 104a, continuously transmits a direct sequence spread spectrum interrogator signal 106 at a first frequency, for example 2440-megahertz. The tag 101a receives this signal 106, modulates its UID code onto the signal 106, and immediately transmits back a frequency-shifted signal 107 at, for example, 5780-megahertz to, for example, antenna 104a. The distance from the antenna module 104a to the tag 101a can then be determined by the cell controller 102a from the round trip time of transmission, accounting for fixed and known delays in the wiring and electronics. The cell controller 102a can quickly switch among antenna modules 104a–d to obtain the distance from the tag 101a to each of antenna modules 104a–d (which receive the return signal 107), and from that information determines the tag's location by triangulation techniques.

Figure 2:
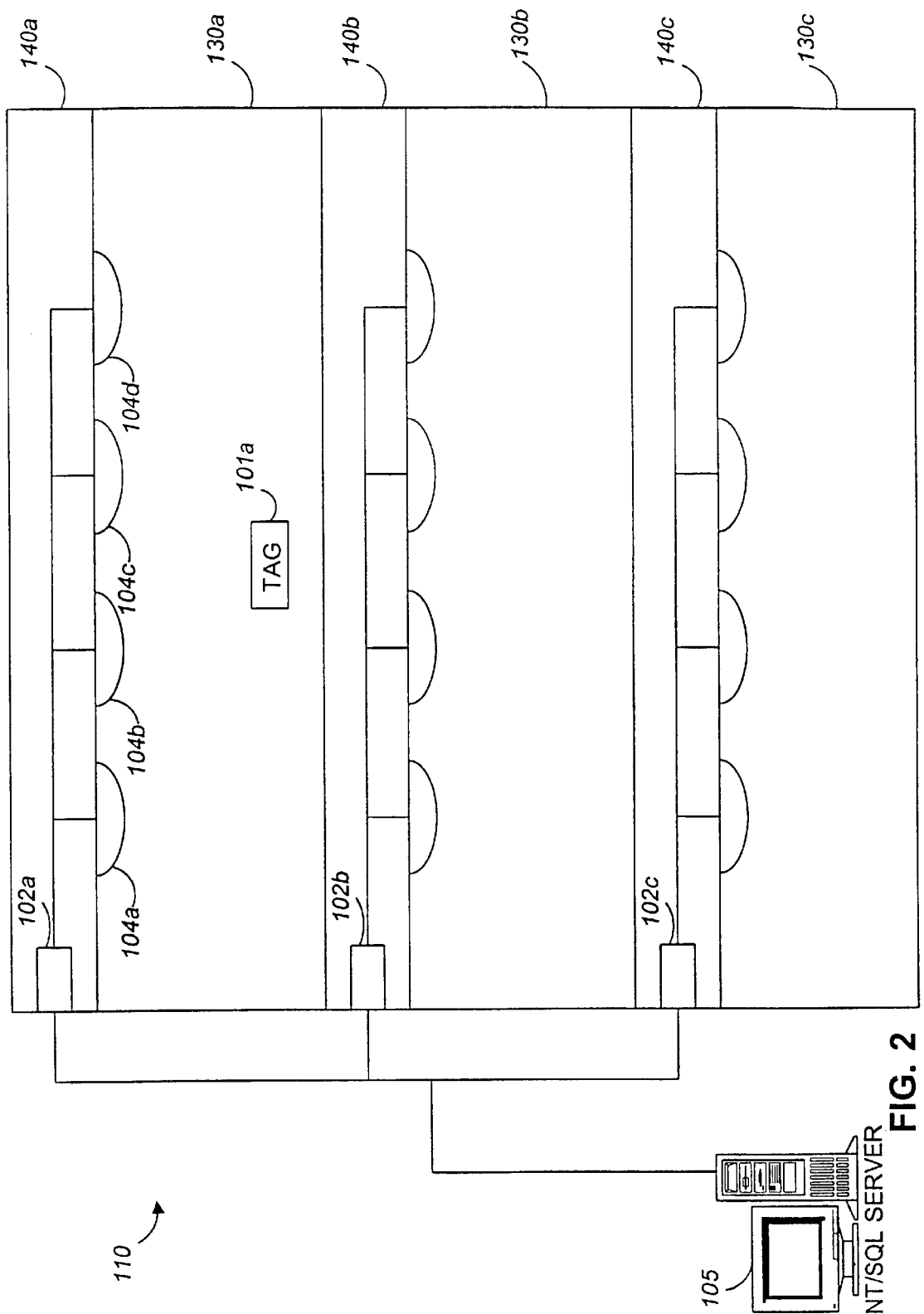
FIG. 2 shows several cell controllers deployed in a multi-story building.

The system 100 is designed to be scaleable, allowing addition of cell controllers to existing cell controllers 102a–c and antenna modules to existing antennas modules 104a–d to improve the precision with which tag location is determined. FIG. 2 shows how a collection of cell controllers 102a–c can be deployed in the large multistory building 110. As shown in FIG. 2, multiple cell controllers 102a–c feed data to a single host computer 105, typically through a TCP/IP communications network. The use of TCP/IP is not required for system operation, and a variety of data protocols and transfer mechanisms can be used. For example, if a local area network is not available, connection to the host can be accomplished via RS485, RS232, RS422, power line modem, or a dedicated phone line. Alternatively, specialized modems designed for use on such cables can be employed.

Each of the cell controllers 102a–c can be installed to cover a separate floor 130a–c, respectively, with the exact configuration being modifiable by a system administrator. On floor 130a, cell controller 102a, with its collection of antenna modules 104a–d, is installed in the ceiling 140a. The same configuration of equipment is used on the remaining floors 130b–c. Antenna modules 104a–d are designed to provide good gain downwardly and horizontally, and poor gain upwardly, so that a vertical location (that is, the floor)

of a tag 101a can be determined by noting which antenna modules 104a–d receive the strongest signals from the tag 101a. Structurally, a ground plane is placed behind each antenna to reflect signals downward. The horizontal location of a tag 101a is then roughly determined by noting which antenna modules 104a–d receive a strong signal from the tag 101a. The horizontal location of the tag 101a with respect to an antenna module 104a can be determined more precisely by estimating the distance from the tag 101a to each antenna module 104a–d, based on the combined time of flight of the interrogation signal 106 and the tag signal 107. Each "cell," consisting of a cell controller 102a and its antenna modules 104a–d, covers several thousand square feet of floor space. Each cell operates independently, enabling more cells to be added without affecting the performance of existing cells.

If a user desires to locate tags by "zone," one antenna per zone can be installed. Users wishing to track one or more tags 101a–c moving down hallways, can install antenna modules 104a–d every 20 or so meters along a hallway 130a–c, and calculate the linear location of a tag 101a by measuring the distance from the tag 101a to those antenna modules 104a–d. Customers wishing to triangulate upon the location of a tag 101a must install enough antenna modules such that the tag 101a will be in range of at least three of the antenna modules. A typical installation will cover a complete facility 110 with a combination of "zone" and "hallway" coverage at a relatively low cost per square foot, and, over time, upgrade certain areas with enough antenna modules to triangulate upon a tag's position.

Tag RF Design

Figure 3:
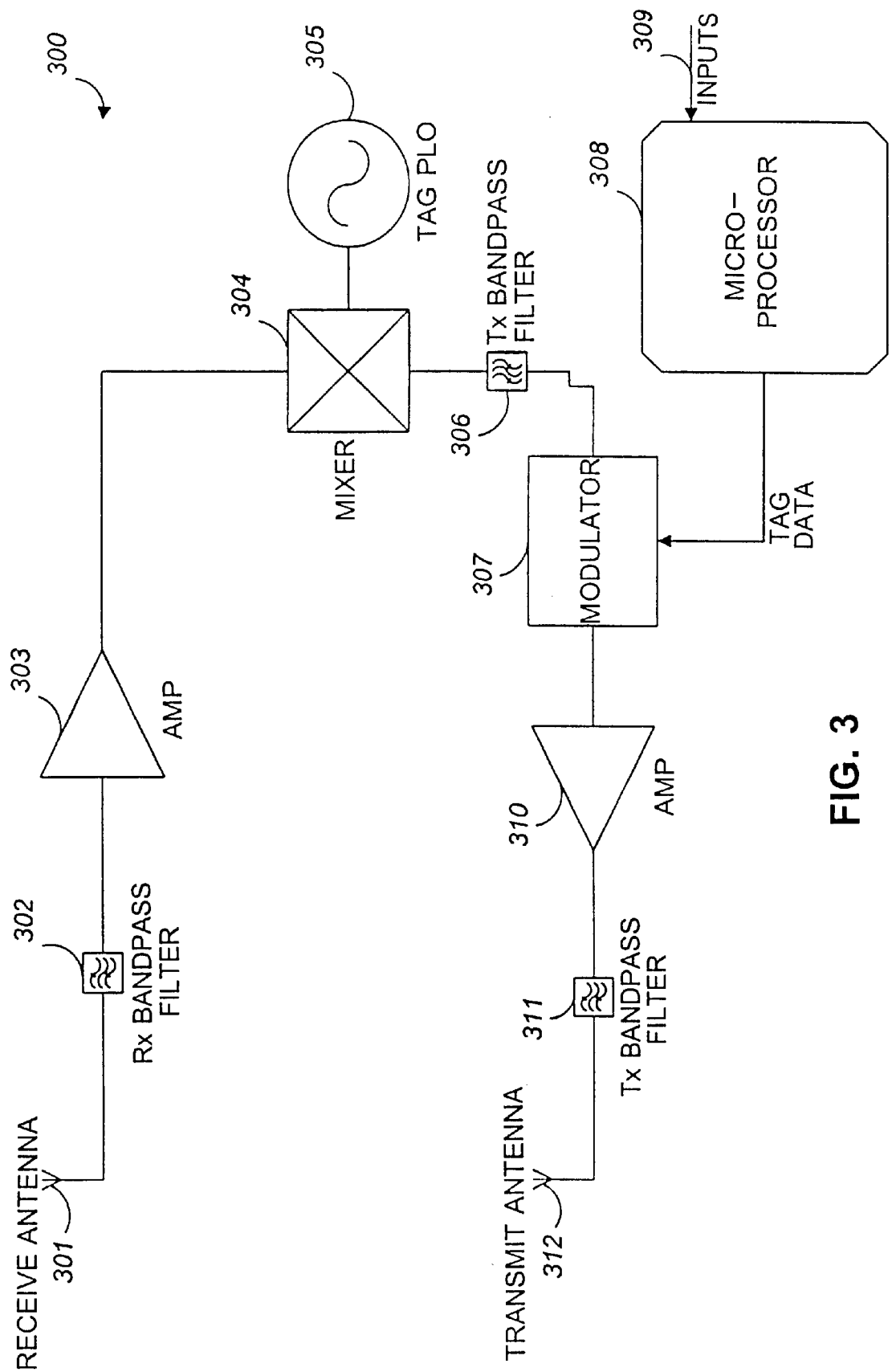
FIG. 3 is a block diagram of a tag RF design according to the invention.

Referring to FIG. 3, a tag RF circuitry 300 receives signal 106 at a tag receive antenna 301 and transmits tag signal 107 at a tag transmit antenna 312. The function of the tag RF circuitry 300 is to transpond the incoming spread spectrum signal 106 by frequency translation. The secondary function of the tag RF circuitry 300 is to modulate tag data onto the emitted tag signal 107, under the control of a microprocessor 308. The information emitted on the tag signal 107 includes, in a preferred embodiment of the invention, the serial number of the tag, datagram headers, and tag data 309 such as that derived from a motion indicator or a low power indicator.

The incoming signal 106 is preferably a direct sequence spread spectrum signal, biphase or quadrature modulated from the cell controller 102a, in the 2440 megahertz band. The signal 106 is received by the tag receive antenna 301, which collects the signal 106 and feeds it into the tag RF circuitry 300.

After the signal 106 is received by the tag receive antenna 301, an Rx (receive) bandpass filter 302 ensures that the tag is receiving signals only in the 2440 megahertz ISM band, rejecting radar signals, electronic newsgathering signals, and the like. In one embodiment, the filter 302 is implemented as an etched coupled stripline filter embedded in the circuit board. The signal 106 is then amplified by an amplifier 303 to ensure that the received signal can be mixed, in a frequency mixer 304, without degrading the signal to noise ratio (SNR).

The frequency mixer 304 translates or shifts the carrier frequency from 2440 megahertz to 5780 megahertz. The incoming signal, with a center frequency of 2440 megahertz, is mixed with the output of a phase locked oscillator (PLO) 305 with a center frequency of 3340 megahertz. This results in a sum frequency of 5780, along with a difference frequency and a variety of harmonics and subharmonics which are removed with a bandpass filter 306. In one embodiment, the PLO 305 consists of a phase locked loop (PLL) chip with three inputs: (1) a sampled output from a voltage controlled oscillator (VCO); (2) a reference tone from a 10 megahertz oscillator; and (3) a frequency programming interface to a microprocessor 308. This generates a pure tone with good phase noise at the 3340-megahertz tag LO frequency. In an alternative embodiment, the PLO 305 outputs a 1670-megahertz tone, which is then doubled to give the desired 3340-megahertz result.

Figure 8:
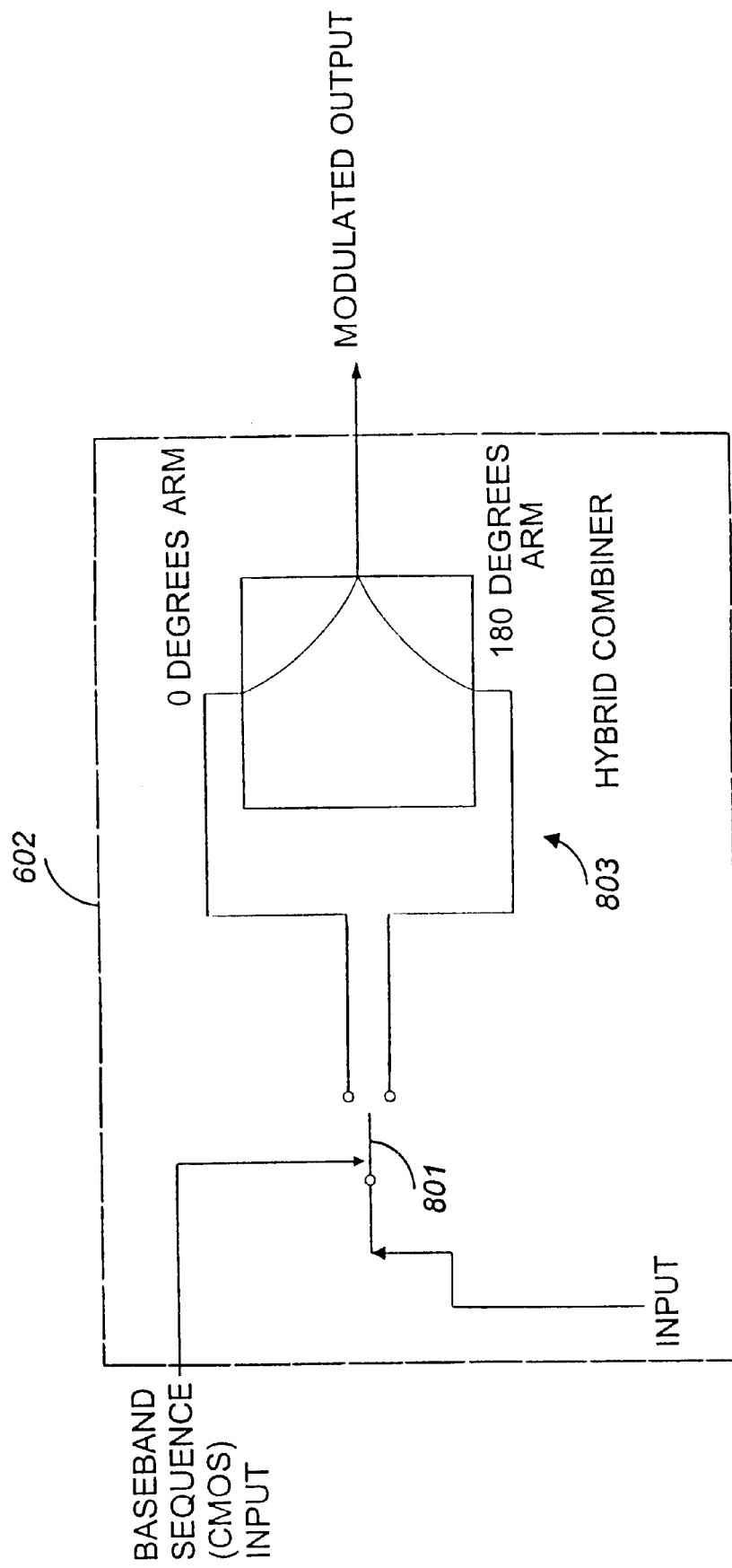
FIG. 8 is a block diagram of a modulator RF design.

The next element of the tag RF circuitry 300 is a biphase modulator 307 which, under control of the microprocessor 308, can either pass the 5780-megahertz signal unaltered, or change the phase of the signal by 180 degrees. The modulator 307 is implemented as a single pole double throw RF switch 801 that feeds a 180 degree hybrid, as shown in FIG. 8. Several forms of modulation can be used, including on-off keyed (OOK) modulation, binary phase-shift keyed (BPSK) modulation, multiple phase-shift keyed (MPK) modulation, and quadrature amplified (QAM) modulation. BPSK is the preferred form of modulation. The output from the modulator 307 is fed into an amplifier 310, then is filtered by a transmitter bandpass filter 311, and the output of filter 311 is emitted from a transmit antenna 312 as the tag signal 107. Since the amplifier 310 operates at high frequency, it consumes significant power, and alternative embodiments (such as that shown in FIG. 4) that make this amplifier 310 unnecessary are preferred. The Tx Filter 311, implemented as a 5-pole filter, is necessary to ensure tag compliance with FCC Part 15 requirements.

Figure 4:
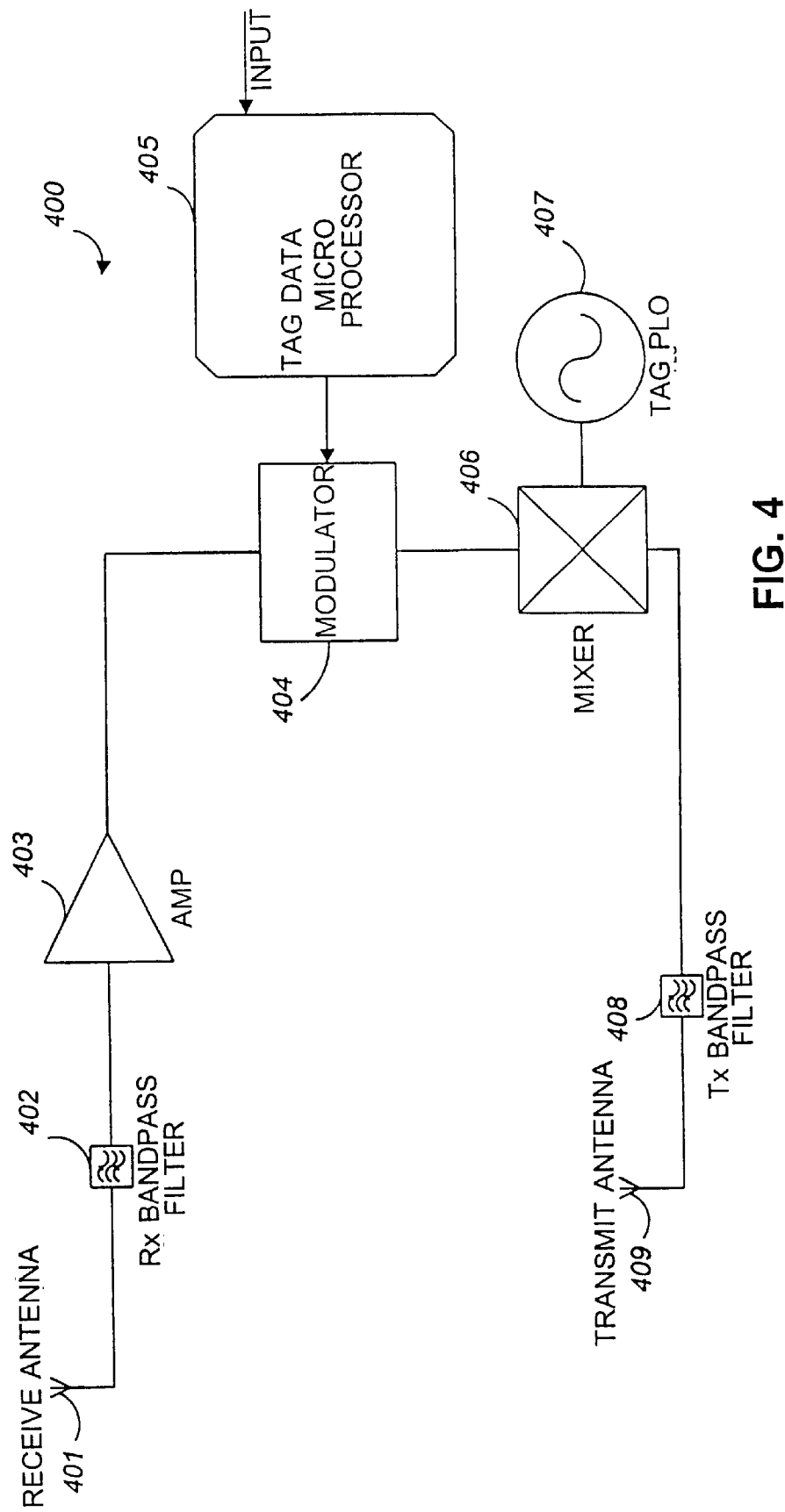
FIG. 4 is a block diagram of an alternative embodiment of a tag.

The tag RF circuitry 300 shown in FIG. 3 is intended to illustrate the general functions of a tag 101a–c, with an embodiment that is workable and self-explanatory. Those skilled in the art will be able to combine multiple functions into single elements in order to conserve power and take full advantage of available parts, or implement the same functions with a custom ASIC. FIG. 4 shows an alternative embodiment 400 which fulfills the same basic functions as that shown in FIG. 3, but with fewer components and using less power. The essential difference between the circuitry 400 shown in FIG. 4 and the circuitry 300 shown in FIG. 3 is that the modulator 404 in FIG. 4 is placed before the frequency mixer 406 in order to reduce the number of components (for example, the amplifier 310 is eliminated) and to conserve power.

In the place of the frequency mixer 304 (FIG. 3) or the time delay element 1505 (FIG. 13), other signal transmission discriminators may be used to transpond by other methods. For example, a tag, such as the tag 101a, can transpond using backscatter, frequency translation by mixing, frequency translation by taking a harmonic, frequency translation by taking a subharmonic, or by signal delay (such as via a SAW device).

Not shown in FIG. 4, but desirable for the tag RF circuitry, is the use of a common crystal reference for both the PLO 407 and clock timing in the microprocessor 405. Accurate timing is an important, if not critical, feature of the system, enabling the cell controllers 102a–c to predict when a tag 101a will transmit a tag signal 107. Using the same crystal reference in the PLO 407 and in the microprocessor 405 clock timing allows the cell controller 102a to accurately calibrate the source by measuring phase shifts in the received signal (as described hereinafter), and to synchronize its clock timing accordingly.

Not shown in FIG. 4, but desirable for some applications, is an embodiment where the transmit antenna 409 and receive antenna 401 are combined into a single element, and which uses a diplexer with the single antenna structure.

The manner in which the tags 101a–c are powered depends on the application. (Note that FIGS. 3 and 4 omit the tag power source.) Typically, a tag 101a will be battery powered, with the RF stage turned on and off under control of the microprocessor 405. In a preferred embodiment, the microprocessor 405 goes into a low power state, where it merely waits until it is time to power up the tag 101a again. In an alternative embodiment, all tag circuitry 400 cycles on and off under analog control, using an RC time constant in the circuit 400 as the timing source.

Using the tag RF circuitry 300 or 400 of FIGS. 3 or 4, if a tag 101a is in range of two of the cell controllers 102a–c, and those cell controllers are sending pseudonoise with low cross correlation characteristics, the tag 101a will correctly transpond both signals simultaneously.

Tags 101a–c require a period of time, on the order of a millisecond, to charge up and charge down. During these brief periods, typically, the tags 101a–c will not be stable enough to use, but will nonetheless emit RF into the radio channel through the transmit antenna 409. For high-performance applications, where radio bandwidth is limited, a microprocessor-controlled switch can be added to the tag's transmit chain to eliminate such spurious emissions.

The tag RF circuitry 300, 400 shown in FIGS. 3 and 4 can be used in conjunction with different pairs of frequencies. The general approach described above works for any two allowable FCC spread spectrum bands. For example, the following combinations are permissible for license-free radio under FCC regulation Part 15.247:

915 megahertz translated to 2440 megahertz.

915 megahertz translated to 5780 megahertz.

2440 megahertz translated to 915 megahertz.

5780 megahertz translated to 915 megahertz.

5780 megahertz translated to 2440 megahertz.

Spread spectrum operation, however, is not required; two licensed narrow bands can be used. However, spread spectrum operation in the 2440 and 5780 megahertz bands is assumed for the remainder of the discussion.

Tag With Time Delay

Figure 13:
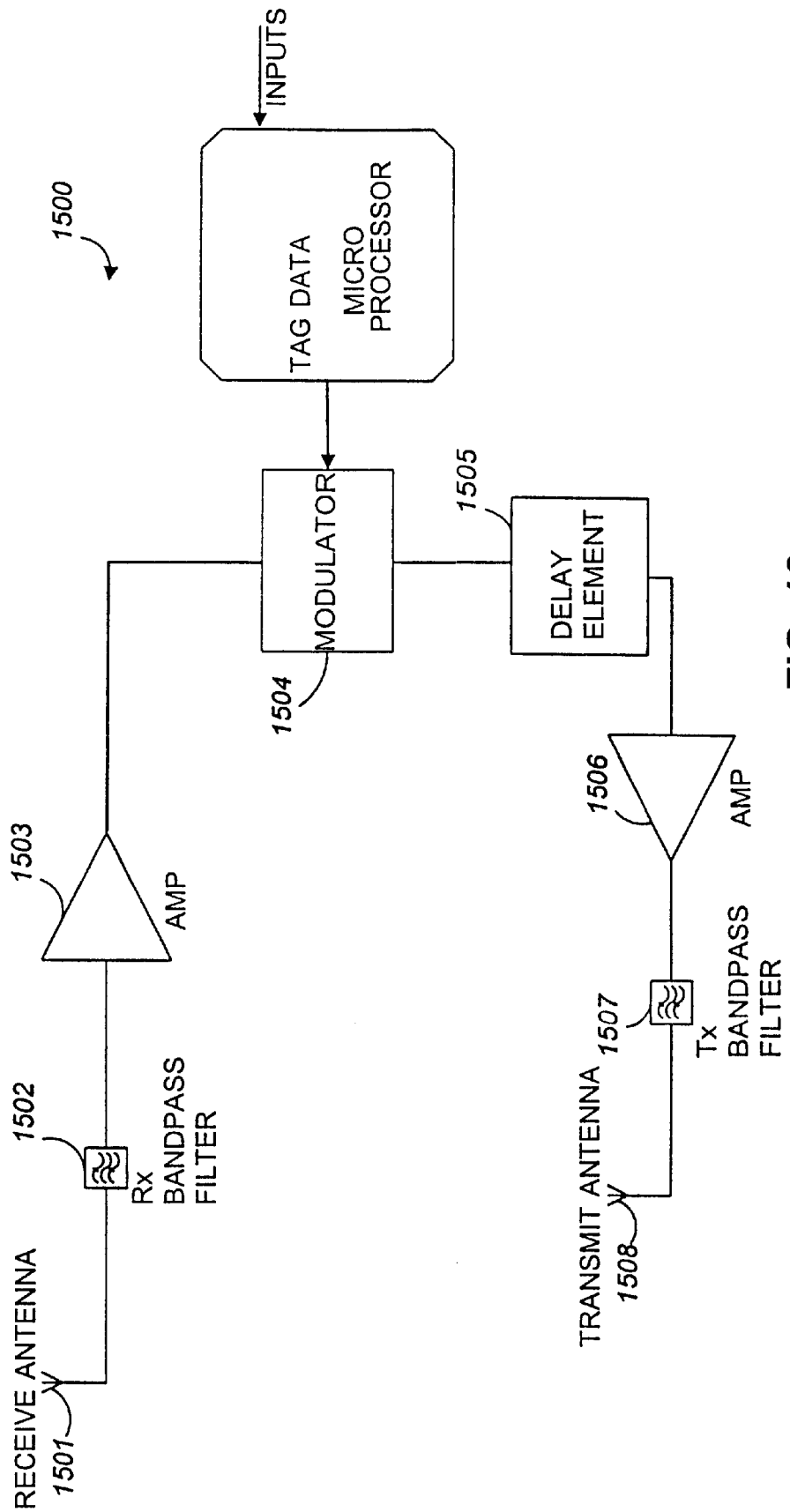
FIG. 13 shows a tag incorporating a delay element.

The tag RF circuitry 300, 400 shown in FIGS. 3 and 4 use frequency division multiple access, i.e., the tag circuitry 300, 400 receives and emits signals on different frequencies. An alternative embodiment 1500 uses time division multiple access, as shown in FIG. 13. For illustrative purposes, assume that the tag circuitry 1500 shown in FIG. 13 takes as an input at a receive antenna 1501 a signal at one frequency, such as 915 mHz, and emits the same signal through a transmit antenna 1508 at the same frequency after a delay of a microsecond. Assume that a cell controller, such as cell controller 102a, transmits an interrogation signal 106 in bursts every 2 microseconds. A tag, such as tag 101a, takes this signal as an input through the receive antenna 1501. The signal then passes through elements 1502–1504, as in FIGS. 3 and 4. A time delay element 1505 is then used to delay for a microsecond. The signal then passes through a transmit bandpass filter 1507 and is emitted from the transmit antenna. A SAW device can be used as the time delay element 1505. During the period of the delay, the cell controller ceases transmission, and reflections of the interrogation signal 106 in the environment die down to a minimal level. This half-duplex approach allows single frequency operation, although with lower bandwidth than with a full-duplex frequency shifting approach. As in the frequency-changing tag, the delay-based tag is capable of modulating the response signal by a 180-degree phase shift. In other respects, the tag design 1500 shown in FIG. 13 is similar to those shown in FIGS. 3 and 4.

Cell Controller RF Design

Figure 6:
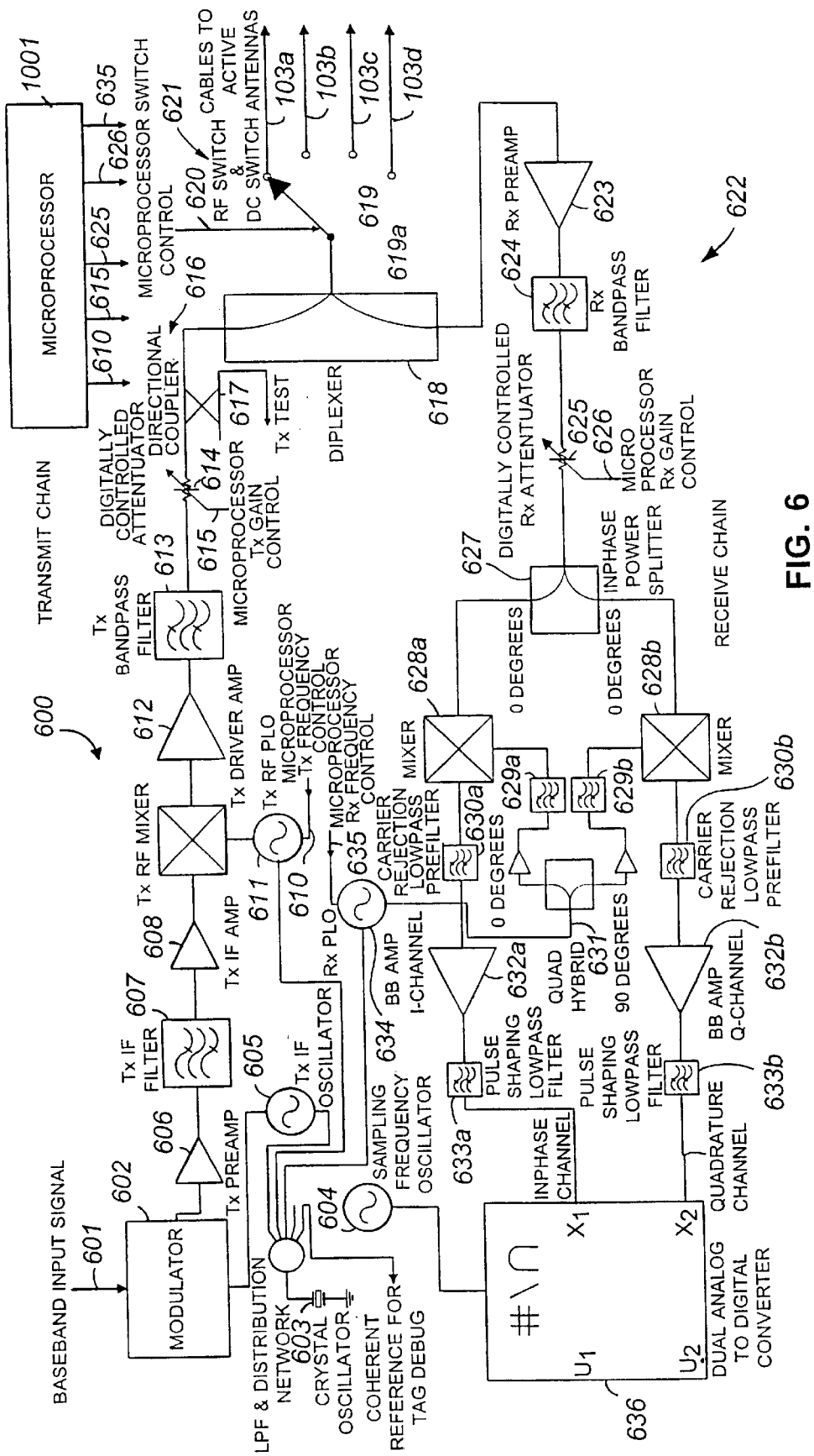
FIG. 6 is a block diagram of the cell controller RF design.
Figure 7:
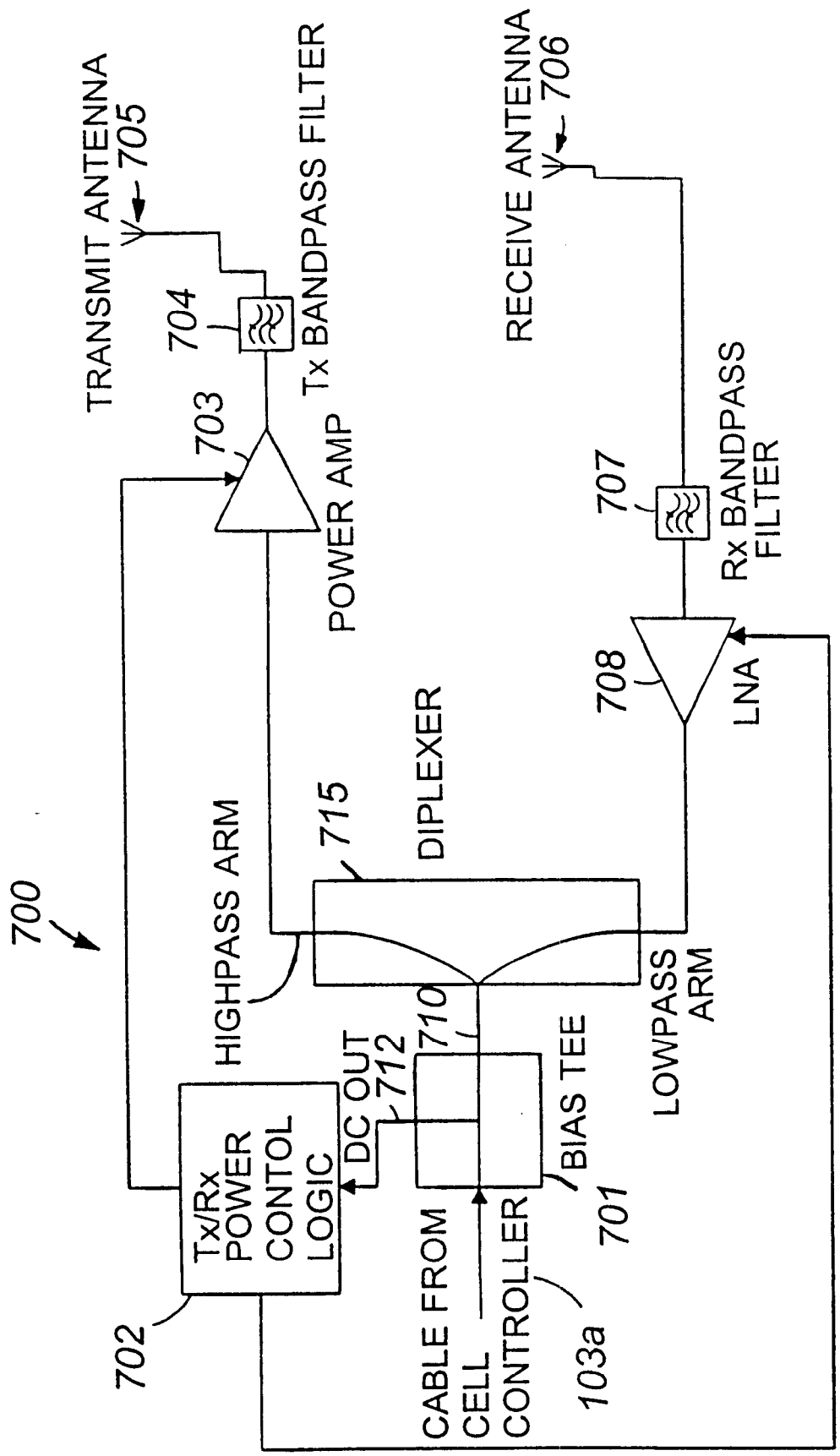
FIG. 7 is a block diagram of a cell controller active antenna module.

FIG. 6 shows the radio stage of a cell controller 102a. The architecture of an antenna module, such as the antenna module 104, is shown in FIG. 7. Together, the cell controller 102a and its remote antenna modules 104a–d modulate a baseband square wave input onto a 2440-megahertz carrier, filter the resulting 2440 megahertz signal to comply with FCC transmission requirements, transmit that filtered 2440-megahertz signal through a selected antenna module, receive a returning 5780-megahertz tag response through the same antenna module, extract the I (Inphase) and Q (Quadrature) components of the demodulated baseband signal, and digitize the result for subsequent processing.

Figure 10:
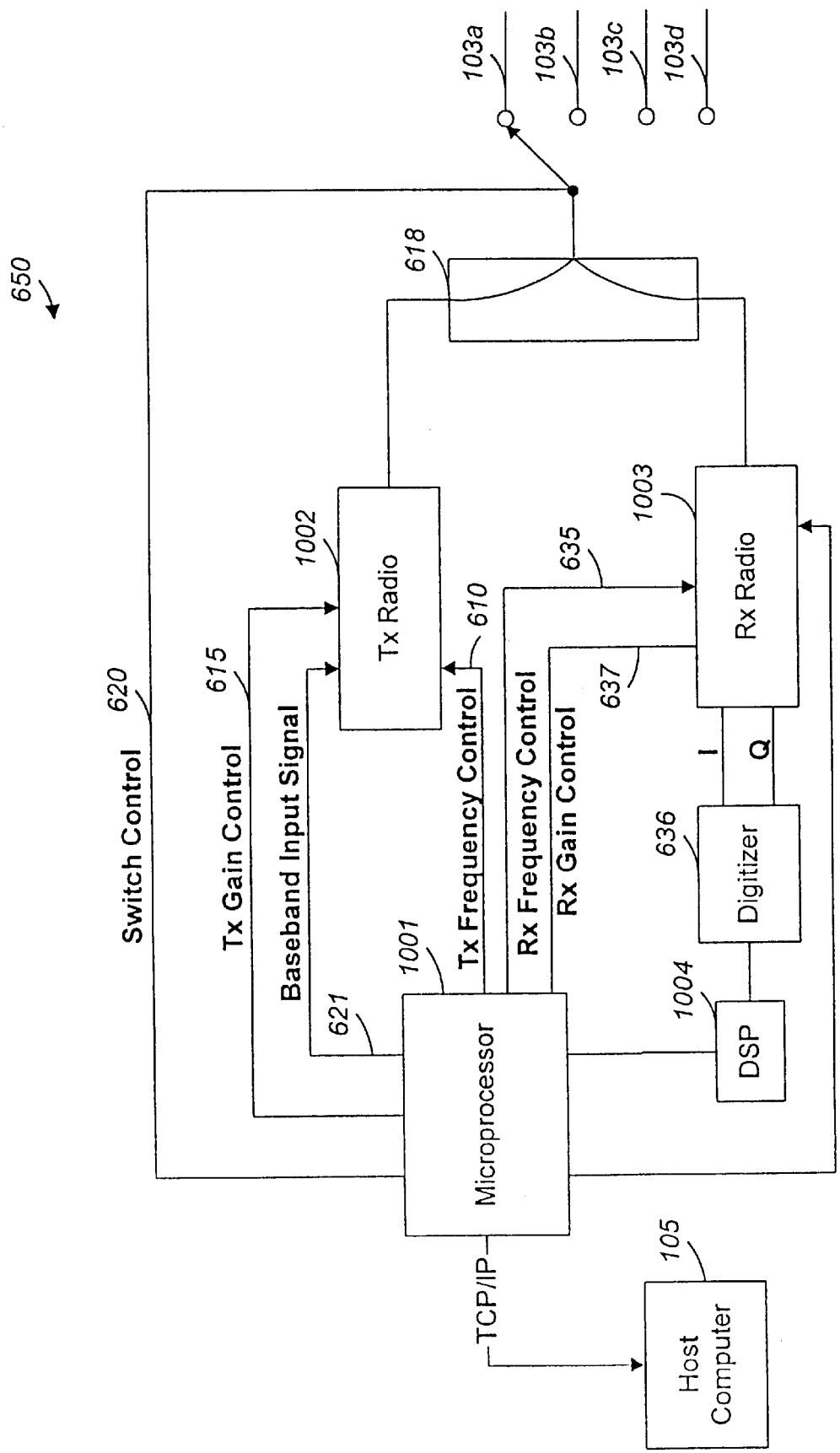
FIG. 10 is a block diagram of a cell controller.

FIG. 10 shows the main components of the cell controller digital subsystem 650. In summary, the digital subsystem 650 provides a baseband input signal 601, and some number of nanoseconds later receives a demodulated response 107 from a tag 102a. The microprocessor 1001, as noted above, can change the behavior of the radio system by (a) modifying the baseband input signal 601; (b) modifying the chip rate, pseudonoise sequence length, and/or the pseudonoise sequence code; (c) modifying the transmit frequency 610 of radio transmitter 1002 and the receive frequency of radio receiver 1003 within a narrow range; (d) modifying the transmit gain of radio transmitter 1002 and the receive gain of radio receiver 1003; and (e) by switching antenna modules 104a–d.

The demodulated response 107 from the tag 102a is split into I (Inphase) and Q (Quadrature) components by the receiver Radio 1003, and digitized by a digitizer 636. An integer DSP processor 1004, for example a TMS 320C54, reduces the output from the digitizer 636, performing correlation operations at high speed. If binary phase-shift keyed (BPSK) modulation is used on the transmitting side, the I and Q channels are correlated separately and combined. For quadrature phase-shift keyed (QPSK) modulation, each channel must be correlated twice, once with each sequence. The correlated data from the integer DSP 1004 is processed by a microprocessor 1001, such as a Pentium processor. For cost savings and higher performance, a less powerful x86 processor, and a floating point DSP processor such as a TMS 320C30 can be used. Communications between the microprocessor 1001 and the host computer 105 is accomplished using a TCP/IP protocol, with Ethernet being preferred.

The data that is input to the transmit chain is a baseband input signal 601 which is a pseudonoise spreading sequence. The length of the sequence and the code encoded in the sequence are set by a cell controller microprocessor 1001, and can be varied depending on signal processing requirements. Thirty-one or 127 bit sequences are typical, giving about 15 dB and 20 dB of compression gain, respectively. The 2440 megahertz and 5780 megahertz bands can support a 40 megahertz baseband input signal 601, and the cell controller 102a is designed to enable this full bandwidth to be utilized.

Figure 5A:
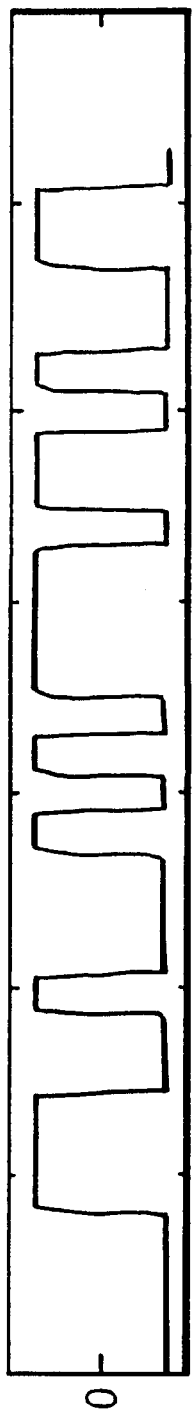
FIGS. 5A–5G are diagrams of a signal as it passes through various stages of the system.
Figure 5B:
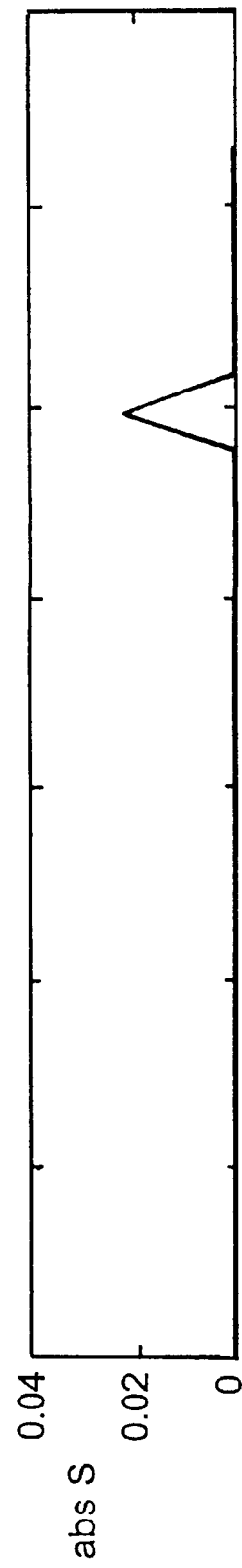
Figure 5C:
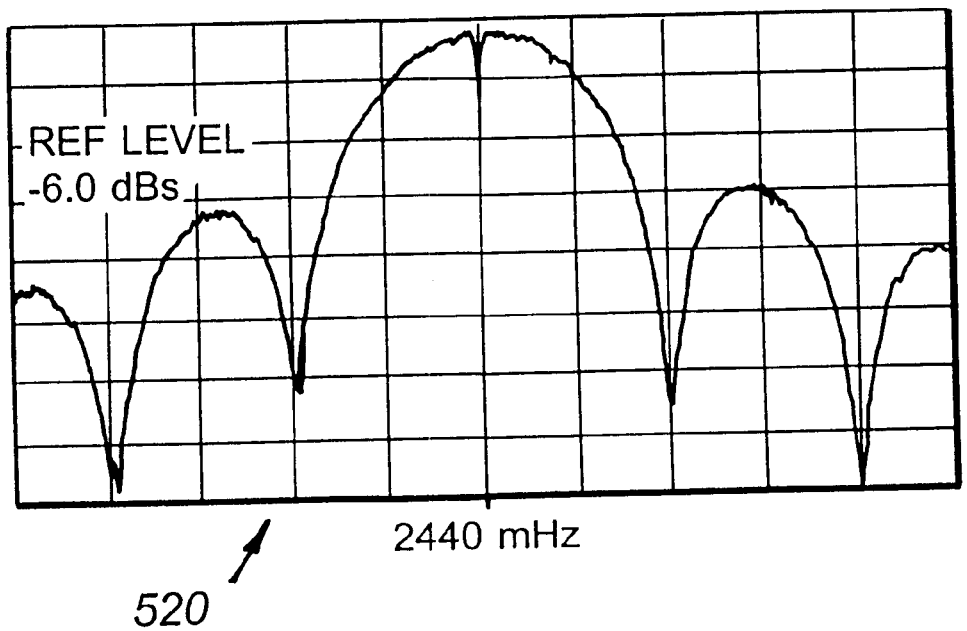
Figure 5D:
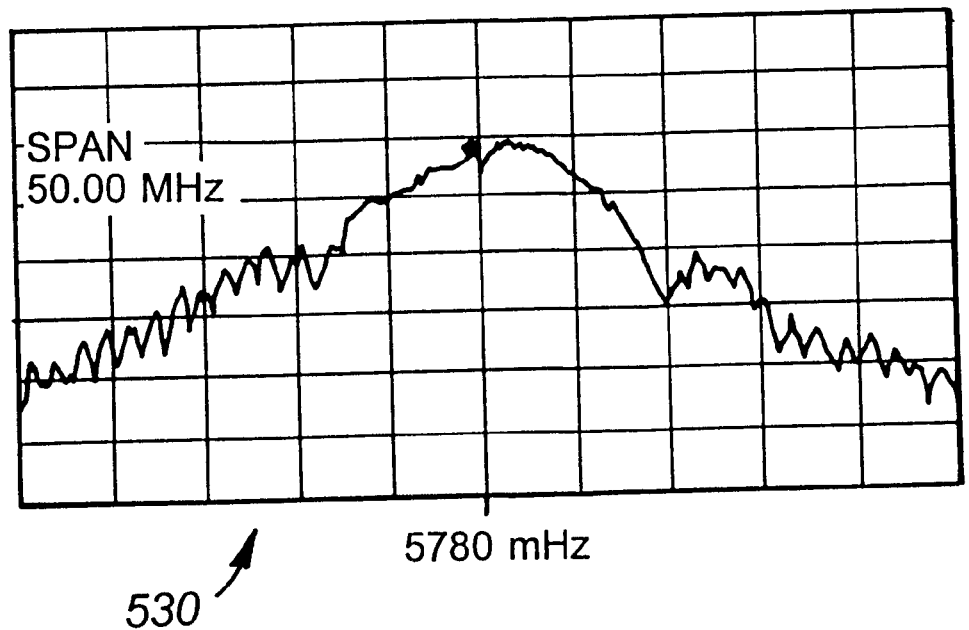
Figure 5E:
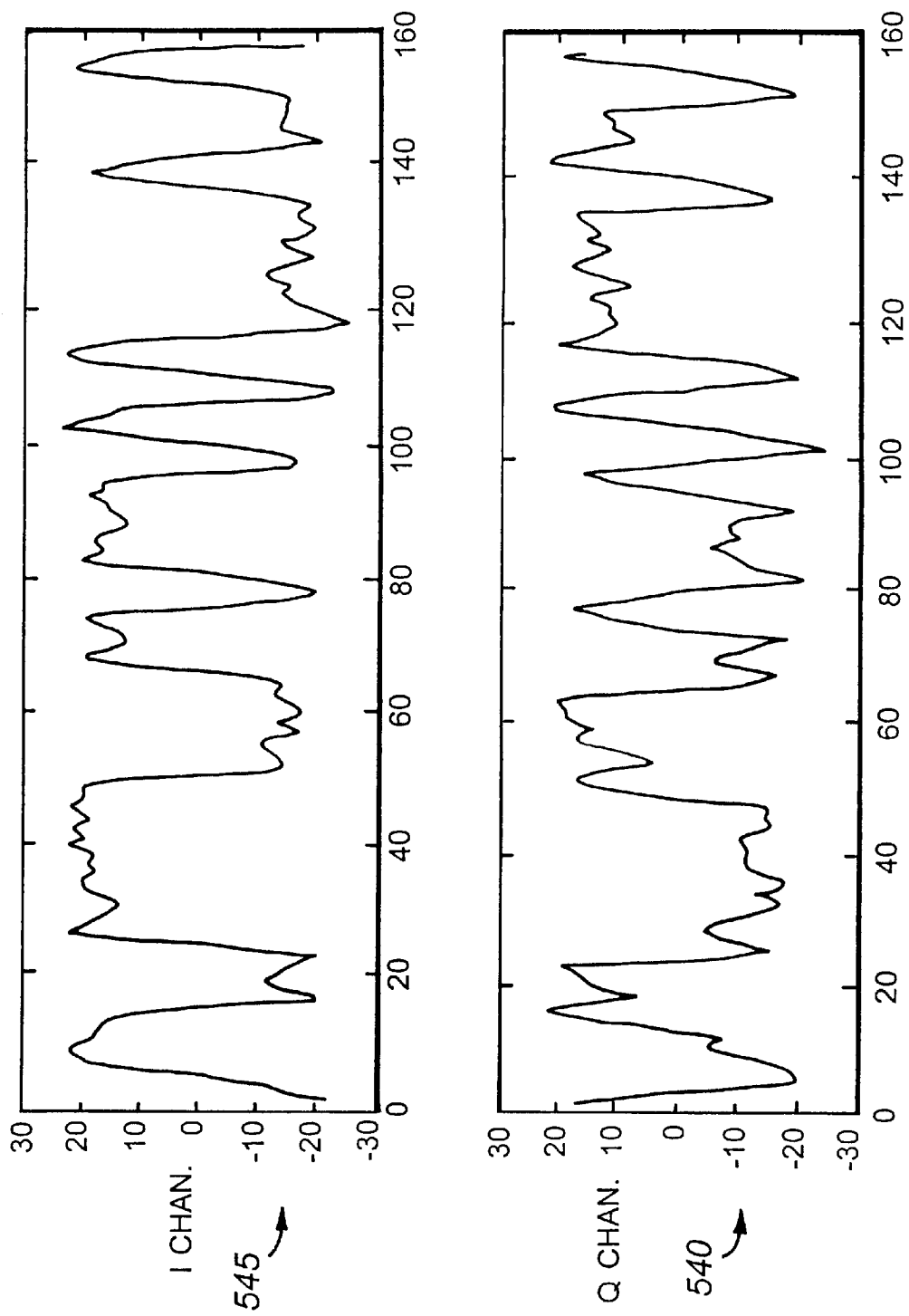
Figure 5F:
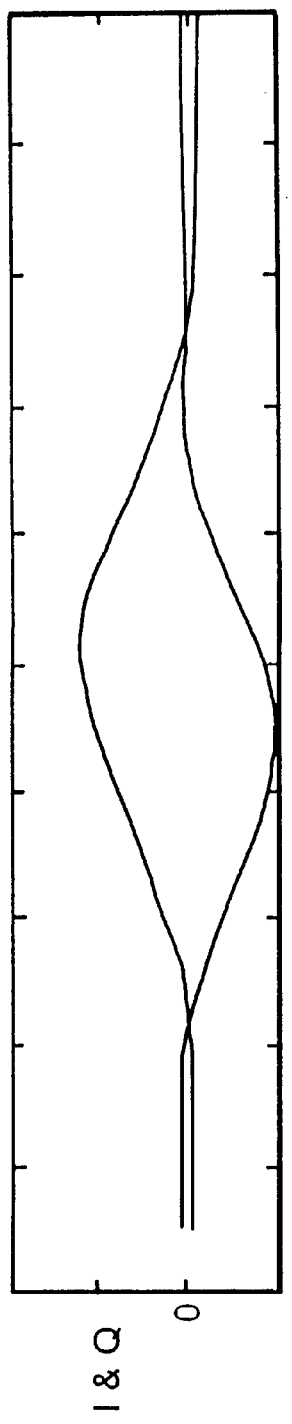
Figure 5G:
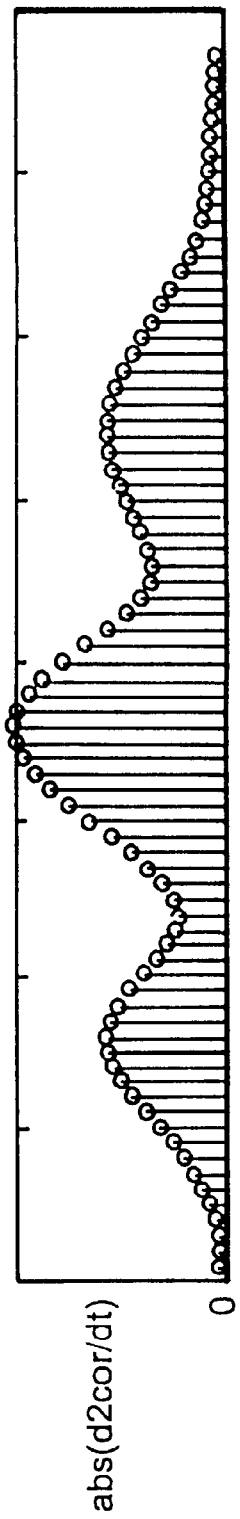

FIGS. 5A–5G show an interrogation signal 106 as it passes through various stages of the cell controller RF circuitry 600. FIG. 5A shows a square wave baseband input to the modulator 500. FIG. 5B shows this baseband input digitally correlated 510. FIG. 5C shows an output 520 from a modulator 602, viewed through a spectrum analyzer centered at 2440 megahertz. FIG. 5D shows a spectrum analyzer view 530 of the tag signal 107, centered at 5780 megahertz. FIG. 5E shows the demodulated response from tag 107, separated into its I (Inphase) 545 and Q (Quadrature) 540 components. FIG. 5F shows the I and Q components, digitally correlated 550. FIG. 5G shows the negative of the second derivative of the correlated waveform, combinging the I and Q components 560.

The modulator 602 (FIG. 6) modulates the baseband input 601 onto a 2440 megahertz carrier. Various forms of modulation are available and well-known to those skilled in the art. For BPSK modulation, the modulator 602 is implemented as a single pole double throw RF switch 801 that feeds a 180-degree hybrid combiner 803, as shown in FIG. 8. The modulator 602 is preferably implemented as a QPSK modulator, which duplicates the BPSK modulator with one channel offset by 90 degrees from the other, each channel driven by a different baseband sequence with acceptable cross-correlation characteristics. Higher order modulation is also possible. Modulation by the modulator 602 results in sidelobes extending for hundreds of megahertz, which need to be filtered to comply with FCC requirements. The 2440 megahertz band has an adjacent band, which imposes very strong filtering requirements, best addressed using in the illustrated embodiment using a SAW filter 607 that combines wide passbands with tight stopbands. A wider passband supports a faster chipping rate in the baseband input signal 601, but a narrower passband provides an opportunity to use a wider range of frequency diversity to avoid jammers and/or support advanced signal processing techniques. The modulator 602 must operate at the same frequency as the available IF filter 607, typically in the range of 200 megahertz to 400 megahertz. A preamplifier 606 is necessary prior to the SAW IF filter 607, and the output of the filter needs to be amplified by an amplifier 608.

A transmit IF oscillator 605, like all other RF oscillators in the cell controller circuitry 600, is phase locked to a 10 megahertz crystal source 603, which is distributed through a filter and splitter network 604 to each of the oscillators. The 10 megahertz source 603 needs to be within a few kilohertz of the 10 megahertz sources on the tags to avoid excessive baseband phase shift.

The output from the IF filter 607 (from amplifier 608) is then mixed by a mixer 609 with the output from a phase locked oscillator (PLO) 611 and is converted to a carrier frequency of 2440 megahertz. The frequency of the PLO 611 can be modified within a narrow range under microprocessor control 610, in order to provide the frequency diversity needed to avoid jammers and/or for various advanced signal processing techniques. The degree of frequency diversity available is related to the specifications of the IF filter 607, with narrower filters permitting a slower chip rate but having more frequency flexibility. Not shown in FIG. 6 is a filter typically needed to remove undesirable harmonic and difference frequencies from the output of the mixer 609.

Following the mixer 609 is a driver amplifier 612 which raises the power level of the signal 106, so that it can be driven down the cable 103a to the remote antenna module 104a, and which buffers the output of the mixer 609 for a bandpass filter 613. The RF bandpass filter 613 is needed to remove FCC non-compliant outputs from the mixer 609. A directional coupler 616 provides a port to examine the signal 106 before it is transmitted to the remote antenna modules, for example antenna modules 104a–d.

An attenuator 614 under microprocessor control 615 allows the signal processing software to decrease output power when a tag 101a–d is known to be nearby. This is helpful in circumstances when a nearby tag is known to be over-driven by the cell controller, and/or the signal processing software needs the tag to operate in a more linear range.

The signal is then fed into a diplexer 618, which combines the transmitted 106 and received 107 signals onto a single wire. The diplexer 618 is a highpass/lowpass filter combination 619a that attenuates a received signal 107 relative to the transmit side and attenuates the transmit signal 106 relative to the receive side. Because of the presence of the Tx and Rx bandpass filters 613, 624, the specifications of the diplexer 618 are not very stringent.

The cell controller RF stage 600 shown in FIG. 6 supports one remote antenna module 104a–d at a time. In order to support multiple antennas from the same cell controller, the system needs a switch 619, which enables a microprocessor control 620 to rapidly switch from one antenna to the next. The switch 619 takes RF and passes it into one of n cables, where n is, for example either 8 or 16. The switch 619 also provides DC power to the selected line. The RF signal is coupled into the cables with a capacitor (not shown), which provides DC isolation, and the DC power is coupled into the cables with RF chokes to provide RF isolation. Thus, the DC and RF travel together through a single coaxial cable to the selected antenna.

The rise time of the DC in an antenna is in the range of 100 microseconds, limited by the effective resistance of the circuitry in and characteristics of the antenna and the capacitors needed for operation. To provide antenna switching time in the microsecond range, the DC power to an antenna is preloaded before the RF is switched.

Referring to FIG. 7, in an antenna system 700, the combined DC and RF signal arrive through a coaxial cable, such as the cable 103a from the cell controller 102a. A bias tee 701 separates the RF signal 710 from the DC signal 712. The DC signal 712 is sent to Tx/Rx power control logic 702 which, in the simplest embodiment is a filter to remove noise from the line and provide a clean 5 volt power source. The RF output 710 from the bias tee 701 is fed into a diplexer 715, which is identical to the diplexer 618 in the cell controller 102a. This is then amplified by an amplifier 703 to the power level allowed by the FCC, and filtered by a filter 704 to remove line and amplifier noise in compliance with FCC regulations. The resulting signal is then sent to a transmit antenna 705.

The transmit antenna 705 and receive antenna 706 are, in this embodiment, patch arrays, providing reduced energy in the vertical direction and spreading energy laterally, so that power is not wasted in the floor and ceiling, and so that minimal power is radiated upward. The 5780-megahertz response 107 from the tag 101a is filtered by a filter 707, amplified by an amplifier 708, and sent back down the cable 103a to the cell controller 102a.

Figure 9:
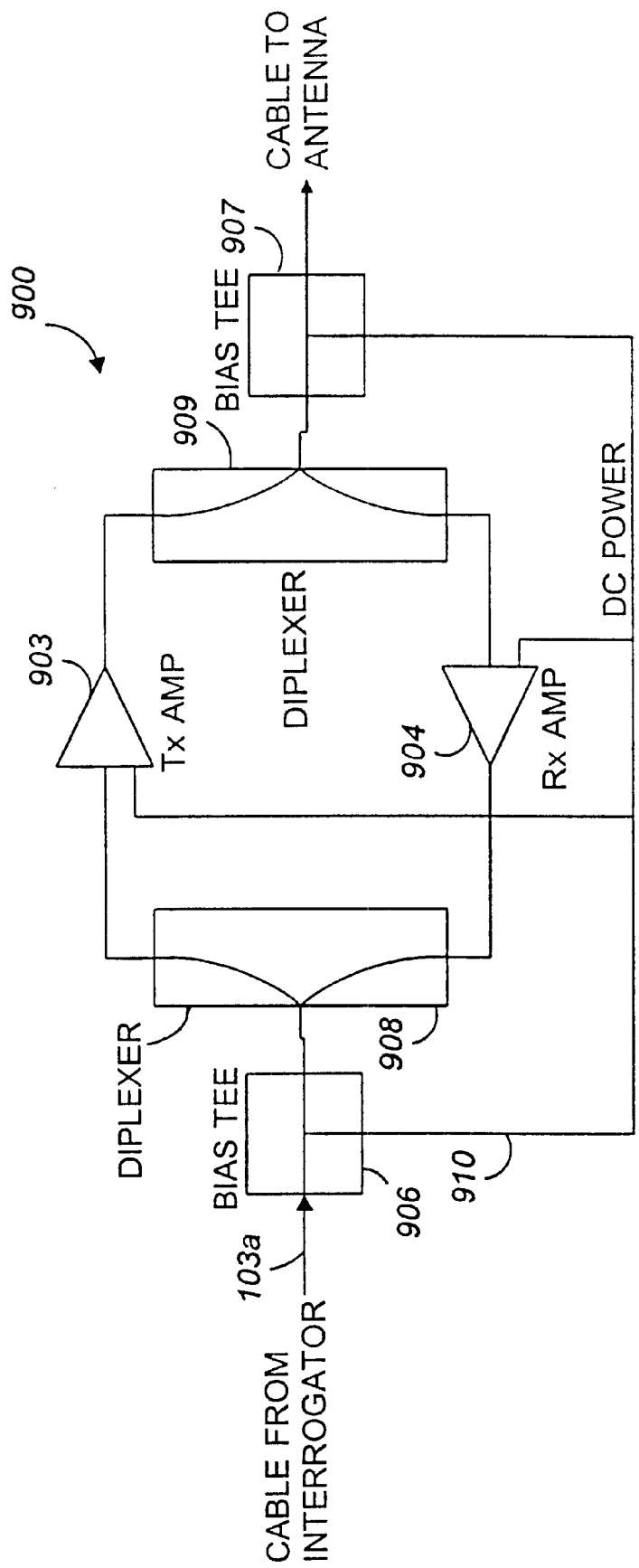
FIG. 9 is a block diagram of a cell controller cable extender module.

The system is designed to use cables 103a–d of a standard length, for example, 20 meters. A cable extender module 900 connects two lengths of cable and supports an extended cable length. Referring to FIG. 9, the elements of the module 900 use the DC power 910 from the cable 103 to drive low noise amplifiers 903, 904, which provide enough gain to drive the next section of cable. Bias tees 906, 907 separate the DC power 910 from the RF signals, and diplexers 908, 909 operate to separate the transmit signal 106 from the receive signal 107.

Referring to FIG. 6, the signal returning from the antenna module 104a to the cell controller 102a passes through the switch elements 621, 619 and diplexer 618 to the cell controller receive RF chain 622. The signal passes through a combination of a preamplifier 623 and bandpass filter 624, the exact arrangement of which varies based on the parts selected. A digitally controlled receive attenuator 625 under microprocessor control 626 is used to avoid saturating the receive chain when the tag 101a is known to be nearby. This is necessary to avoid losing the relationship between the I and Q components of the received signal 107, necessary for proper correlation and other signal processing.

The signal then enters an I–Q zero IF demodulator circuitry 627–633. As noted previously, the microprocessor Rx frequency control 635 must be set in tandem with its counterpart in the transmit chain. The resulting signal, an example of which is shown in FIG. 5E, is fed into a digitizer 636 (FIG. 10) in preparation for digital signal processing.

The embodiment described above is simplified, based on an assumption that the cell controller can send and receive from only one antenna at a given time. Improved performance can be achieved by selecting send and receive antennas independently of each other. Software in the cell controller determines which antenna module receives the best signal from the tag. For example, if a particular tag, such as tag 101a, is close to an antenna, such as antenna 104a, then the antenna 104 will receive a strong signal from the tag 101a. The cell controller 102a can then transmit a signal, such as signal 106, from antenna 104a, and receive the transponded response 107 at antennas 104b, 104c, and 104d in turn. This can result in a stronger signal received at the antennas 104b–d, compared to the signal the antennas 104b–d would have received had the signal 106 been transmitted and the signal 107 received from each of the antenna modules 104b–d independently.

Figure 14:
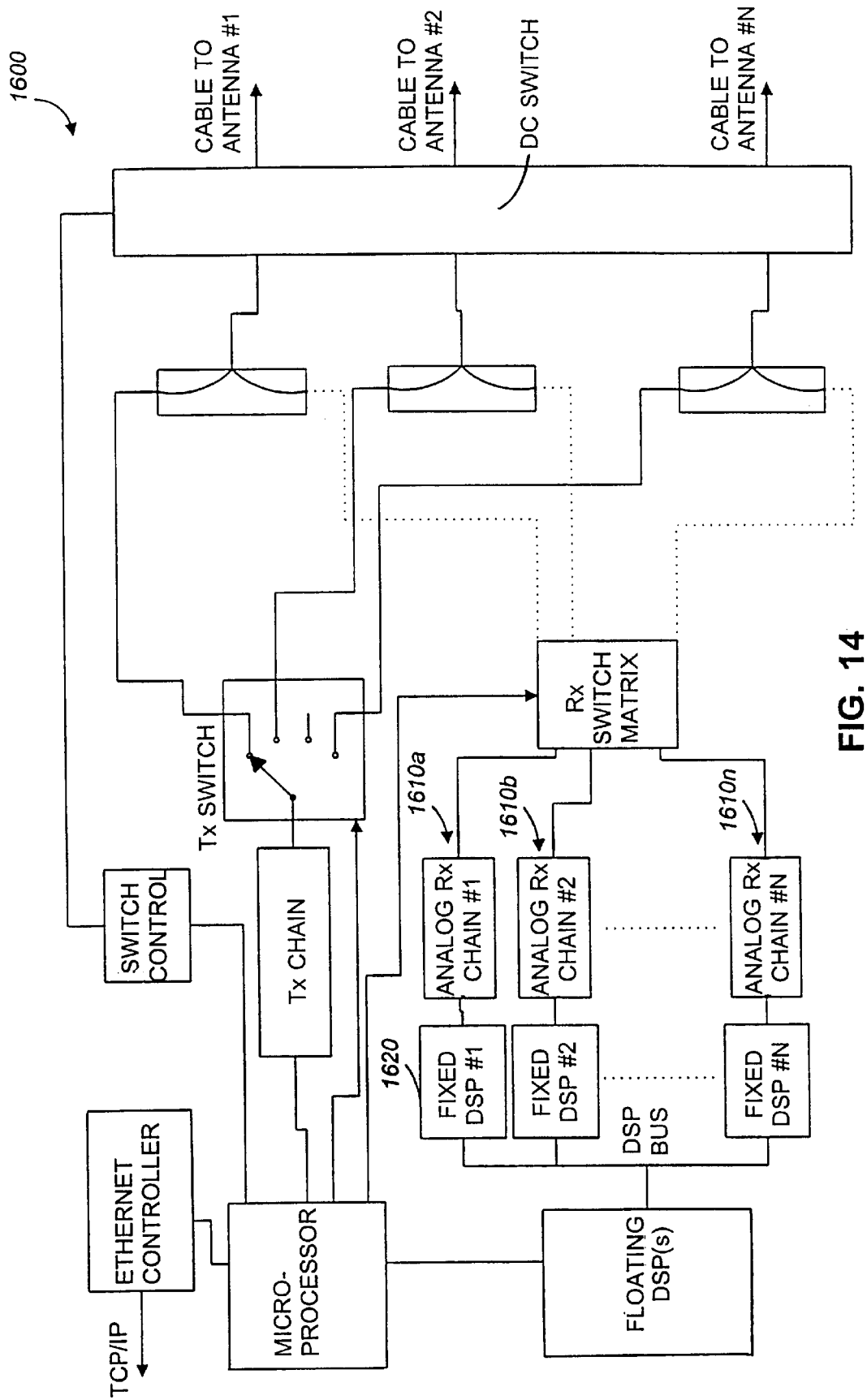
FIG. 14 shows several cell controller receive chains operating in parallel.

The design 1600 shown in FIG. 14 provides multiple receive chains 1610a–1610n operating in parallel. Each of the receive chains 1610a–1610n includes an IQ demodulator, a digitizer, and a correlating element, shown as integer DSPs, for example, integer DSP 1620. Implementing each receive chain on a separate card provides scaleability. The use of multiple receive antenna modules for the same transmitted signal allows the cell controller signal processing software to employ spatial processing techniques to isolate multipath effects. These techniques take advantage of the fact that the multipath-corrupted response will have different characteristics at each antenna.

Bit Detection

Figure 11:
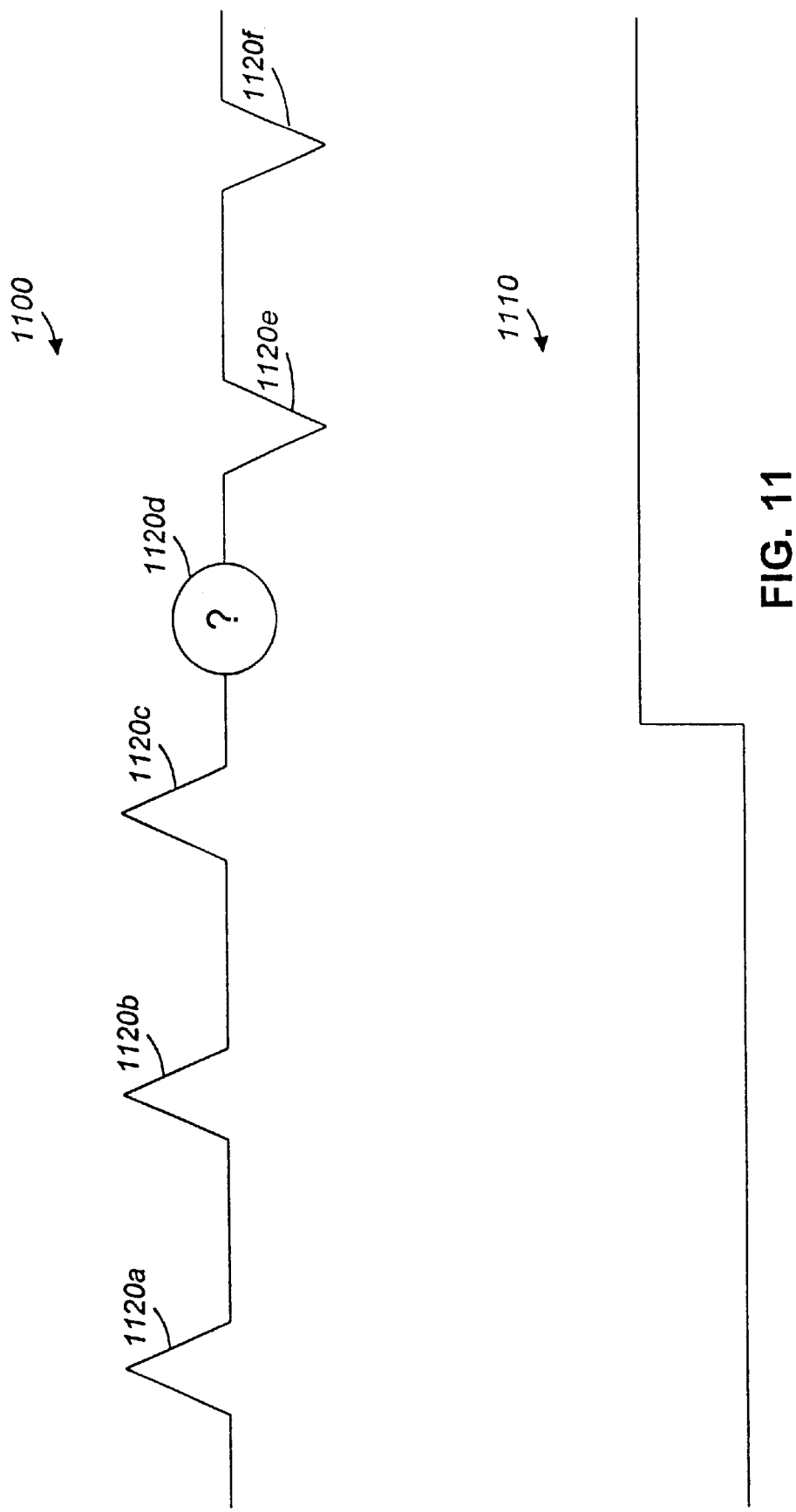
FIG. 11 illustrates extraction of tag data from a series of correlations.

In an ideal environment, a simple triangular correlation peak can be derived from a received tag signal 107, as shown in FIG. 5B. Distortions introduced in the radio chain, particularly caused by indoor multipath effects, result in a distorted but nonetheless distinct correlation peak, a function of which is shown in FIG. 5G. For the purpose of bit detection, the essential point is to reliably detect the existence of a series of correlations, which indicates the operation of a tag. FIG. 11 shows how tag data is extracted from a series of correlations. In the left half of the chart 1110 shown in FIG. 111, the tag is transmitting a "zero." This is accomplished by setting the tag's modulator 307 to pass the interrogator signal 106 unaltered. When the received tag signal 107 is correlated with the transmitted pseudonoise sequence, essentially identical correlation peaks result. Three such peaks 1120a–c are illustrated here. During the time of the fourth correlation 1120d, the tag flips the phase of the modulator by 180 degrees, indicating a "one," as shown in the chart 1110. Since the modulation is changed in the middle of a bit, the fourth correlation data peak 1120d is corrupted, and is best ignored. The fifth and sixth correlation peaks 1120e–f cleanly reflect the 180-degree shift.

Pseudonoise sequences can be varied under microprocessor control at the cell controller. When a tag's presence is first detected, relatively short sequences must be used, as shown in FIG. 11. Once the tag's bit timing is ascertained, it is possible to use longer sequences for improved SNR, which is helpful in distance measurement.

An important consideration, not shown in FIG. 11, is that the balance between the Inphase and Quadrature components of the received signal will drift over time. This is because the 10-megahertz sources in the cell controller 102a and the tag 101a will differ typically by a few kilohertz. This factor can be calibrated by noting the phase difference between contiguous correlations, detectable at the baseband by noting changes in Inphase and/or Quadrature components of the received signal. As noted previously, this same calibration process can be used to calibrate the tag clock in reference to the cell controller clock, allowing for precise prediction of tag chirping time, without needing to precisely measure the timing of tag bit transitions.

Interaction Between Cell Controllers and Tags

Each tag is a stand-alone unit that is unaware in any way of the outside world. Each tag has a Unique Identifying Code (UID) associated with the tag when it is manufactured.

A tag wakes up periodically and, for a short period of time, converts any incoming 2440-megahertz signal 106 to an outgoing 5780-megahertz signal 107, while modulating its UID and other data onto the outgoing signal 107 which it chirps (transmits). The tag does not communicate with other tags. The tag does not explicitly respond to an interrogation signal, but merely transponds any incoming signal 106 in the 2440-megahertz band, which may or may not include a pseudonoise sequence from a nearby cell controller antenna module 104a. This approach greatly simplifies the design and fabrication of the tag 101a.

Some portion of the time, two or more tags will transpond simultaneously. In many cases, one of the two tags will return a stronger signal than the other tag and some data will be lost in such a collision. To avoid collisions occurring in a repeating pattern, tags "wake up" and chirp their UIDs at randomized times, which can be calculated (by both the tag and the cell controller) based on a pseudorandom number generator which incorporates the tag's UID. For example, for a tag which chirps approximately every 5 seconds, the tag generates pseudorandom numbers between 0.0 and 2.0, and adds these to a 4.0-second minimum delay time, resulting in a sequence of delay times uniformly distributed between 4.0 and 6.0 seconds.

It is possible to use analog inputs, such as an input from an internal clock or the delay of an RC circuit, to the pseudorandom number generator to vary the seed over time, but a purely digital scheme is preferred to enable the cell controller 102a to accurately forecast a known tag's chirping time. A typical pseudorandom number generator has the form:

N=rand(seed)　　　　　　　　　　　　　　　　　Formula 1

The resulting N is used as the seed for the next pseudorandom number in the pseudorandom number sequence. When using a pseudorandom number generator of this kind, it is possible that two tags will use the same seed, resulting in their tag signals repetitively colliding. Further, with small differences in tag clocks, all pairs of tags will eventually drift through this synchronized state for some amount of time. To avoid these conditions it is desirable to incorporate each tag's UID, as noted above, into the delay time for that tag, resulting in a different pseudorandom sequence for each tag, that is:

$$\text{Delay} = f(N, UID) \quad \text{Formula 2}$$

One simple example of such a function is:

$$\text{Delay} = \text{Xor}(N, \text{BitRotate}(UID, \text{AND}(N, 1111_2))) \quad \text{Formula 3}$$

Referring to Formula 3, it is possible to reconstruct seed from UID, Delay and And(N,$1111_2$), by calculating N=Xor (Delay, BitRotate(UID, And(N,$1111_2$))).

Figure 12A:
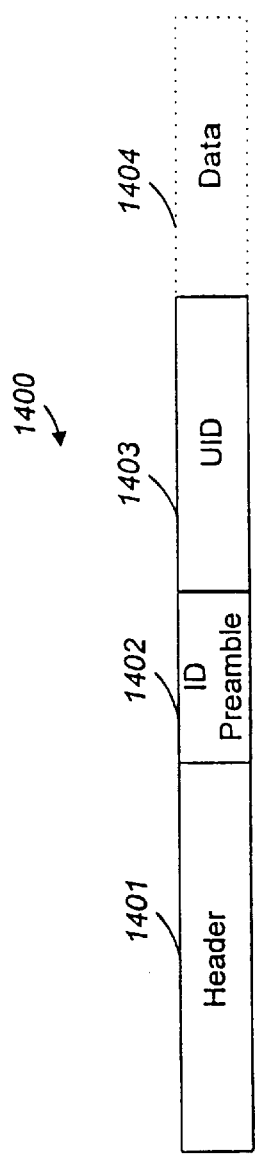
FIGS. 12A–C are diagrams of tag datagrams.

Referring to FIG. 12a, one embodiment of the tag datagram 1400 contains a header 1401 to enable the cell controller to detect the tag's presence, followed by an identifier preamble 1402, followed by the tag's UID 1403. The header 1401 can be of zero length. The identifier preamble 1402 can be implemented, for example, as a validity check such as a cyclic redundancy check (CRC). Given a sufficiently simple Delay function and high clock stability, the cell controller can infer the tag's chirping sequence by noting the timing of a series of chirps of the datagram 1400.

Figure 12B:
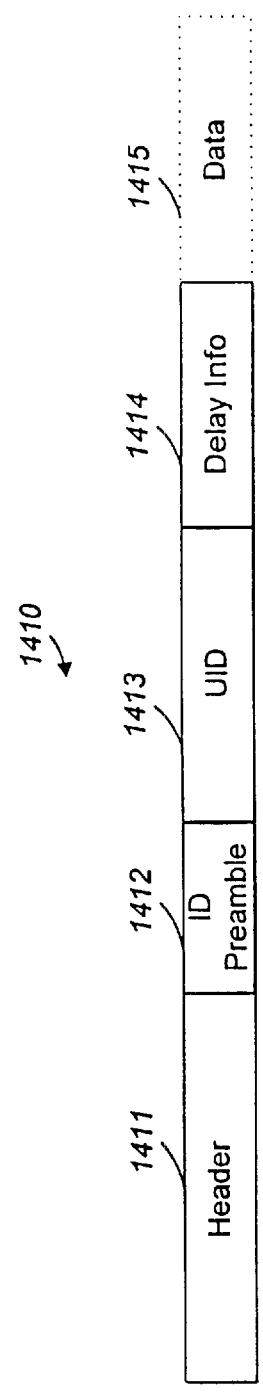

Referring to FIG. 12b, in another embodiment of the tag datagram 1410, the tag adds Delay information 1414, thus enabling the cell controller to forecast the transmission time of the tag's next and subsequent chirps of the datagram 1410. In the example of Formula 3, this information would include the data: Delay and And(N,$1111_2$).

Figure 12C:
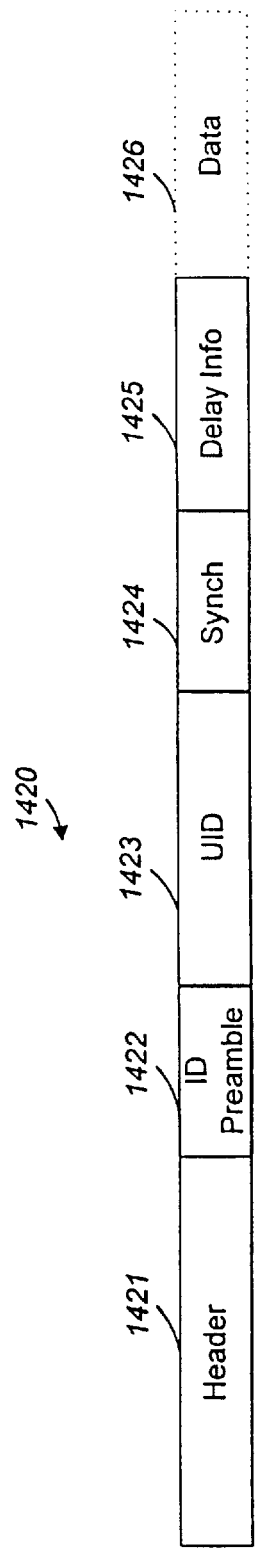

Referring to FIG. 12c, in another embodiment of the tag datagram 1420, a shorter header is used than in the datagrams 1400, 1410 of FIGS. 12a and 12b, such that the cell controller is not guaranteed to have enough time to detect the tag's presence before the UID 1423 contained in the tag datagram 1420 is transmitted. Appended to the datagram 1420 is the transmission delay 1425 of the next chirp, enabling the cell controller to anticipate the time that the tag will next chirp its datagram 1420, even if the cell controller does not have enough time to identify the identity of the tag from the first received chirp of the datagram 1420. The cell controller can then anticipate this next chirp and ascertain the identity of the tag at that time. Once the tag is identified, the cell controller can duplicate the tag's pseudorandom number generator to calculate the times of all future chirps by the tag. In the tag datagram 1420 of FIG. 12c, a series of special synchronization bits 1424 are inserted between the UID 1423 and the delay information 1425, to reliably determine when the UID 1423 ends; in this case, the UID 1423 must be defined so that it does not include the synchronization sequence or its inverse.

FIGS. 12a, 12b, and 12c include optional data sections 1404, 1415, 1426, which allow a tag to transmit data to the cell controller. These sections 1404, 1415, 1426 can include data from within the tag, such as from a motion detector or a low power indicator, or from an external device attached to the tag, such as metabolic information for medical telemetry if the tag is attached to a person.

An identifier preamble, related to the tag UID, precedes the tag UID. This identifier preamble enables the cell controller to quickly verify that a tag is chirping as expected, without needing to decode the tag's complete UID. This frees the cell controller for other activities, such as communicating with different tags in proximity to other antennas. The identifier preamble 1402, 1412, 1422 and tag UIDs 1403, 1413, 1423 are set externally, and if appropriate can be defined to include error correction bits.

The UID of a tag may be hardcoded into the tag (e.g., as a serial number). Tags may be grouped based on their UIDs, and different groups may be associated with different cell controllers. Each cell controller contains information (received from another source) about which tags are in the group associated with the cell controller. When a cell controller receives a tag signal, the cell controller can extract the UID information from the tag signal to determine whether the tag signal was sent by a tag in the group associated with the cell controller.

In the tag datagrams 1400, 1410, 1420 of FIGS. 12a–c, the delay information fields 1414, 1425 and data fields 1404, 1415, 1426 can also include error correction bits. For simplified processing, data can be reduced to a stream of half-bytes. To determine what value to send for a particular half-byte, the tag can look up the half-byte's value in a table which contains, for example, 8-bit values, which represent the value of the half-byte plus error correction information. A single cell controller can handle all three types of datagrams 1400, 1410, 1420 shown in FIGS. 12a–c. The choice of datagram type would depend on the application requirements for a particular tag.

The amount of time it takes for a cell controller to detect the presence of a tag may vary depending on the nature of the cell controller design. For example, a 100-microsecond time to switch antennas may be significant when the cell controller is cycling among 16 antennas. In order to be assured that a tag will be identified the first time its tag signal is received by the cell controller, the tag datagram header must be long enough to give the cell controller time to try all of its antennas. If the performance requirement is in the range of 100 tags per second, 2 or 3 extra milliseconds in the header can be tolerated. But for higher performance requirements, or when tag power consumption must be minimized, it is necessary to either improve the performance of the cell controller or to use a tag datagram 1420 of the type shown in FIG. 12c.

By anticipating time of transmission from a particular tag, the cell controller can collect tag information from a variety of antennas in an organized way, in order to better calculate tag location by using antenna and/or frequency diversity. If a tag is responding exactly when it is expected to respond, it is not necessary for a cell controller to detect every bit transmitted in the tag datagram in order to be reasonably certain that it is receiving a signal from the correct tag. A correct identifier preamble arriving exactly on schedule is almost certain to be from the expected tag. This provides an opportunity for the cell controller to try a variety of antennas that may or may not be able to communicate with the tag.

If it is necessary to track tags between the tag datagram transmissions, the tag can be configured to send shorter transmissions more frequently. For example, if a tag is configured to chirp its datagram on average every 10 seconds, it may also be configured to transmit a much shorter code more frequently, such as every half-second. This shorter code might be as short as one bit long, and take just a few microseconds to transmit. Thus, even hundreds of such transmissions per second would consume only a small percentage of the communication channel. The cell controller can anticipate the exact timing of each such transmission, thus matching each signal with the originating tag based on the time of the transmission. Error correction codes can be arranged such that long chirps from one tag will not typically be corrupted by quick chirps from other tags. The cell controller has the data to forecast most of such collisions.

When a tag is first introduced into a cell controller's range, collisions between datagram transmissions of different tags will occur in an unpredictable way. Transmission by a tag newly introduced into the area, or by a tag which spontaneously increases its transmission rate (such as in response to a motion detector or "panic button"), cannot be forecast by the cell controller 102a, and might cause data corruption. However, once the tag is identified, previous collisions can be modeled and questionable data discarded. Alternatively, if signals from two tags collide, the cell controller can select an antenna such that the signal the antenna receives from one tag will be stronger than the signal the antenna receives from the other tag.

In a more advanced tag design, the cell controller has a means for sending information and instructions to the tag during the times that the tag is known by the cell controller to be in operation. Such instructions can include commands to be passed on to a device attached to the tag. The cell controller is capable of downloading such information, most simply by on-off keying, or for more advanced tags by flipping the pseudonoise bit sequences to indicate one or zero. In general, the downlink (downloading) approach is driven by tag cost and feature requirements, with higher bit downlink transmission rates requiring more expensive receivers that consume more power. Thus, a single cell controller can support read-only tags, read/write tags, and high-speed read/write tags simultaneously, with the cell controller adapting its behavior depending on the features supported in a particular tag.

Timing of transmission from tag to cell controller depends on the item being tagged. Inventory and equipment can be set to transmit relatively infrequently, such as once per minute. More frequent transmissions would be required, for example, for tags on people in a secure facility. For read/write versions of tags, timing of transmission could be modified on command from the cell controller.

Alternative tag designs enable variation in transmission time based on environmental factors. For example, motion detectors may be placed in a tag to decrease the time between transmissions when the tag is in motion. As another example, a tag might transmit more frequently and with higher power when the tag has been tampered with. As another example, a tag might incorporate a slightly modified Electronic Article Surveillance (EAS) device, which would cause the tag to transmit its UID more frequently when in range of a standard EAS detector. More generally, if a tag is attached to another electronic device, transmission interval can be modified under the control of that device.

Tag Power

Tags 101a–c transmit a low RF power level in order to increase their portability and lifespan. In addition, tag signal transmissions 107 are designed to be only a few milliseconds in duration. Therefore, even if a tag transponds its UID every few seconds, careful tag design allows the battery life of the tag to approximate the shelf life of the battery itself. For even lower power usage, a motion detector can be incorporated into the tag so that, for example, transmissions can be less frequent when the tag is stationary.

For some situations, battery replacement may be accomplished by incorporating the battery in an attachment mechanism. For example, re-usable tag electronics may be attached to a disposable patient bracelet, with the battery included in the bracelet. As another example, a battery may be incorporated into the clip of an ID bracelet. More generally, a battery may be incorporated into an inexpensive disposable portion of an active RFID tag, with the electronics in the other, more expensive, portion.

If the item to which a tag is attached is a power source itself, the tag could tap into that power source. This approach is most practical in situations where the tag can be designed into the equipment itself (such as a handheld computer), or where the equipment and power source are large (such as a forklift). A larger power source allows for longer tag range.

Estimating Tag Location

A tag signal 107 is received at a time that is the sum of (1) known fixed delays in the cell controller 102a that transmitted the interrogator signal 106, due to its circuitry and the wiring to and from its antenna modules 104a–d, (2) fixed time delays in the antenna module 104a and tag 101a, and (3) the time for the interrogator signal 106 and tag signal 107 to travel through the air.

Since (1) and (2) are fixed, attention can now be turned to (3), the travel time of the interrogator signal 106 and tag signal 107 through the air. The duration of the pseudonoise sequence modulated onto the 2440 MHz carrier signal 106 by the cell controller 102a must be greater than the combined travel time of the signal 106 and the tag signal 107. Techniques for correlating a pseudonoise sequence are well known in the art. In the absence of multipath effects, the cell controller 102a can derive a simple triangular correlation peak from the received tag signal 107, as shown in FIG. 5B. But in most indoor environments, the actual received tag signal looks more like that shown in FIGS. 5D–5G. Indoor radio signals are subject to substantial multipath effects, due to reflection from a variety of surfaces, such as whiteboards, fluorescent lights, file cabinets, elevator shafts, steel beams, and the like. When a tag 101a transmits a tag signal 107, the sum of the direct tag signal 107 and reflected signals is received at the cell controller antenna module 104a. A variety of approaches can be employed in order to extract a correlation peak from such information, with the particular approach chosen depending on the available signal quality, processing power, and required performance.

A 40-megahertz chip rate results in a correlation peak with a rise time of 25 nanoseconds, corresponding to a rise time distance of about 25 feet. Since tag location is calculated using round-trip travel time, single-chip accuracy therefore allows tag distance to be calculated within about 12 feet, without any advanced signal processing.

Approximate location of a tag can be calculated by noting when correlated signal-to-noise ratio rises above a predefined level. Improved accuracy can be achieved by trying a small variety of carrier frequencies and choosing the one that rises the earliest; such frequency diversity is supported by the radio system shown in FIGS. 4–6. This approach is sensitive to the system signal-to-noise ratio.

An alternative approach finds the peak of the correlation function. For an improved result, the signal delay is measured by taking the negative of the cross-correlation function's second derivative and finding the location of its peak, as shown in FIG. 5G.

For highest accuracy, the MUSIC algorithm, known to those in this field, can be used, for which accuracy in the 0.01 chip range has been reported. MUSIC requires frequency diversity, which is supported by the radio system herein disclosed and shown in FIG. 6. The method is based on a decomposition of the eigenvector space of the pseudonoise correlation matrix of the delay profile data vector. Frequency diversity is required, where each distinct frequency provides the information to solve for an additional multipath component. For tags that are mostly stationary, necessary data can be collected and the calculation completed as a background process. For inventory applications, motion detectors can be incorporated into the tag, which would then inform the cell controllers whenever their locations need to be recalculated.

In situations where adequate data collection time, antenna diversity, frequency diversity, or processing power are not available, a variety of heuristic techniques can be used to calculate tag location, even in the presence of severe multipath effects. A variety of techniques well-known in the art can be used to estimate bearing to each antenna, which can be employed as required.

In many circumstances, although precise accuracy in calculating tag location is not required, it may still be important to calculate tag location with reference to a floor or partition. Story-by-story discrimination in a building can be accomplished by mounting antennas in the ceiling that radiate downward (or antennas in the floor that radiate upward), as shown in FIG. 2. Similarly, antennas mounted sideways on horizontal partitions can determine location relative to those partitions. Relatively narrow beamwidth antennas, which are less sensitive to multipath effects, can be directed at doorways and the like.

A cell controller antenna 104a can be mounted near a computer screen, with coverage corresponding to viewing angle of the screen. Software can then be arranged to automatically configure the operating system for the person in range, or to blank the screen for security purposes depending on who is or is not in range. Similar concepts can be used in conjunction with copying machines, microfilm readers, restricted equipment, and the like.

A single antenna module can include three separate antennas placed in a triangle. By comparing phase difference using the Inphase and Quadrature components of the returning signal, an indication of the tag's angle can be determined. In high frequency embodiments, such as at 2.45 gigahertz, such antennas could be within inches of each other and be quite effective.

Heuristic techniques can be used to analyze the correlation profile to estimate the time at which the correlation began, that is, the time at which the correlation peak begins to be distinguishable from the "noise" baseline. Frequency diversity can provide a variety of samples, the best of which can be chosen. Improved estimates can be achieved by pattern matching the correlation peak with one of a vocabulary of well-studied typical correlation profiles. For calibration purposes, tags can be placed at known fixed locations, and tags passing near those locations will likely demonstrate similar correlation profiles. Such fixed tags can also be utilized to detect the presence of jammers (objects which emit, intentionally or unintentionally, interfering signals) and to provide a real-time testbed for trying a variety of antijamming techniques.

Antenna diversity is the most important tool for improving the accuracy of tag location calculation. If low accuracy is required, antennas can be placed so that only one or two antennas are in range of a given tag. In this case there is insufficient data for triangulation, and only enough information to detect tag presence and estimate tag distance from one or two antennas at any one time. Approximate bearing of a tag can be estimated from the signal strength of antennas designed for the purpose and well-known to those skilled in the art; with the caveat that such bearing tends to reflect the strongest signal received, which might include a substantial multipath component. Conversely, for areas requiring high accuracy, a diversity of relatively narrow beamwidth antennas can be installed, for example, at entrances, which together provide a clear picture of location.

Antenna diversity also provides system scaleability. For other facilities, or sections within facilities, that do not require calculation of tag location with high accuracy, substantially omnidirectional and/or ceiling mounted antennas can be installed relatively far from each other, for a relatively low cost per square foot of coverage. For facilities, or sections within facilities, that require high positional accuracy, a diversity of closely-spaced and/or directional antennas can provide high accuracy at an increased cost.

Cell Controller Operation

The design of the overall system, and the fact that the intervals between tag signal transmissions are generated pseudo-randomly, provide an opportunity for secure operation. Tags dispersed at the entrance of a secure facility can be tracked through that facility and a special code can be emitted when the tag is tampered with. Although the tag's code can be determined by monitoring the tag's response, the tag's transmission interval varies according to an algorithm that can be arranged to be known only to the tag and the host, and impossible to directly determine without destroying the tag. The tag may for example, include an element, such as a physical element, for reprogramming its code and transmission interval. For example, a photo ID with an incorporated tag might be reprogrammed each time the person wearing the photo ID passes a security checkpoint, potentially in conjunction with biometrics technology.

For full coverage of a facility, multiple cell controllers can be installed, covering somewhat overlapping areas. Although each cell controller will be operating according to a search and data collection method, rapid movement between antennas, the pseudonoise code, the changing chipping rate, and so forth, will appear as random noise to another cell controller. In addition, codes with known cross-correlation characteristics, such as Gold Codes, can be allocated to various cell controllers by the host computer, particularly the codes used to search for tags. Alternatively, cell controllers can switch choice of pseudonoise codes on a randomized basis.

For tags on the border between two cell controllers, each cell controller reports the tag's distances from its antenna modules. The central host 105 assembles this data to calculate the tag's location.

A variety of pseudonoise codes are available for use by a cell controller. Thus, if one code seems to be receiving interference from other users of the spectrum, the cell controller can choose another code. The tag, being in essence a transponder, does not need to know the particular code being used. Likewise, center frequency can be adjusted somewhat if another user is causing difficulty.

Other embodiments are within the scope of the following claims. For example, the order of performing steps of the invention may be changed by those practiced in the field and still achieve desirable results.

What is claimed is:

1. A tag comprising:
  a receiver for receiving a first signal in a first frequency range;
  a discriminator that operates on the first signal to provide a second signal that can be discriminated from the first signal;
  a digital logic device that generates tag-specific data;
  a modulator that modulates the tag-specific data onto the second signal to generate a tag signal;
  a transmitter that transmits the tag signal; and
  an enabling device that periodically enables the tag to receive the first signal and transmit the second signal at times that are independent of the first signal.

2. The tag as claimed in claim 1, wherein the discriminator comprises a device that frequency translates the first signal to provide the second signal in a second frequency range.

3. The tag as claimed in claim 1, wherein the discriminator comprises a circuit that introduces a time delay into the first signal to provide the second the signal.

4. The tag as claimed in claim 1, wherein the enabling device is a microprocessor.

5. The tag as claimed in claim 1, wherein the enabling device maintains the tag in a low power state between consecutive transmissions of the tag signal.

6. The tag as claimed in claim 1, wherein the tag-specific data comprises a unique identification code that uniquely identifies the tag.

7. The tag as claimed in claim 6, wherein the tag signal comprises synchronization bits to reliably determine where the unique identification code ends.

8. The tag as claimed in claim 6, wherein the unique identification code associated with the tag is used by the enabling device to generate times at which the tag is periodically enabled.

9. The tag as claimed in claim 6, wherein the digital logic device changes the unique identification code in response to a received signal.

10. The tag as claimed in claim 1, wherein the tag specific data comprises a header.

11. The tag as claimed in claim 1, wherein the tag specific data comprises a validity check.

12. The tag as claimed in claim 1, wherein the tag specific data comprises an error correction code.

13. The tag as claimed in claim 1, wherein the digital logic device changes the times at which the tag is enabled in response to a received signal.

14. The tag as claimed in claim 1, further comprising:
a random number generator coupled to the enabling device to generate the times at which the tag is periodically enabled by the enabling device.

15. The tag as claimed in claim 1, wherein the enabling device uses the tag-specific data to generate times at which the tag is periodically enabled.

16. The tag as claimed in claim 1, wherein the modulator modulates the second signal using amplitude modulation.

17. The tag as claimed in claim 1, wherein the modulator modulates the second signal using binary phase-shift keyed modulation.

18. The tag as claimed in claim 1, wherein the modulator modulates the second signal using multiple phase-shift keyed modulation.

19. The tag as claimed in claim 1, wherein the modulator modulates the second signal using quadrature amplitude modulation.

20. The tag as claimed in claim 1, wherein multiple first signals are received by the tag simultaneously, and wherein the tag simultaneously generates multiple tag signals corresponding to each first signal received.

21. The tag as claimed in claim 1, further comprising an object associated with the tag, and wherein the tag signal comprises data derived from the object associated with the tag.

22. The tag as claimed in claim 1, wherein the tag specific data comprises data obtained from a person associated with the tag.

23. The tag as claimed in claim 1, wherein the first signal has a center frequency substantially in a range of 902–928 MHz and the second signal has a center frequency substantially in a range of 2400–2483 MHz.

24. The tag as claimed in claim 1, wherein the first signal has a center frequency substantially in a range of 902–928 MHz and the second signal has a center frequency substantially in a range of 5725–5875 MHz.

25. The tag as claimed in claim 1, wherein the first signal has a center frequency substantially in a range of 2400–2483 MHz and the second signal has a center frequency substantially in a range of 5725–5875 MHz.

26. The tag as claimed in claim 1, wherein the first signal has a center frequency substantially in a range of 2400–2483 MHz and the second signal has a center frequency substantially in a range of 902–928 MHz.

27. The tag as claimed in claim 1, wherein the first signal has a center frequency substantially in a range of 5725–5875 MHz and the second signal has a center frequency substantially in a range of 2400–2483 MHz.

28. The tag as claimed in claim 1, wherein the first signal has a center frequency substantially in a range of 5725–5875 MHz and the second signal has a center frequency substantially in a range of 902–928 MHz.

29. The tag as claimed in claim 1, wherein the enabling device is an RC circuit that comprises a resistor and a capacitor.

30. The tag as claimed in claim 1, incorporated into a system for detecting the tag, the system further comprising:
at least one tag reader comprising at least one antenna for receiving tag signals transmitted by the tag.

31. The system as claimed of claim 30, the tag reader further comprising a transmitter for transmitting the first signal.

32. The system as claimed in claim 30,
the tag reader further comprising a calculation unit for calculating a location of the tag based on a time of reception of the tag signal by the at least one antenna.

33. The system as claimed in claim 32,
the tag reader further comprising:
a quadrature demodulator for extracting inphase and quadrature components of the tag signal; and
a digitizer for digitizing the inphase and quadrature components of the tag signal for subsequent processing.

34. The system as claimed in claim 30, wherein the tag reader comprises a cell controller that is coupled to a plurality of antennas to receive the tag signal.

35. The system as claimed in claim 34, wherein the cell controller is configured to calculate a distance from the tag to each antenna that receives the tag signal based on a time of transmission of the tag signal and a time of reception of the tag signal at each such antenna.

36. The system as claimed in claim 32, wherein the tag reader is configured to modify operating characteristics of a piece of equipment coupled to the tag reader based on the location of the tag.

37. The system as claimed in claim 36, wherein the piece of equipment comprises a computer screen.

38. The system as claimed in claim 30,
the tag reader further comprising a microprocessor that derives information from the tag signal.

39. The system as claimed in claim 38, further comprising:
a computer-readable storage medium coupled to the tag reader for storing the information derived from the tag signal.

40. The system as claimed in claim 30, wherein the tag reader comprises a device for determining from the tag signal received, a time at which the tag will next transmit a tag signal.

41. A method for providing a tag signal, comprising acts of:

receiving at a tag a first signal;

operating with the tag on the first signal to provide a second signal that can be discriminated from the first signal;

generating with the tag, tag-specific data;

modulating with the tag, the tag-specific data onto the second signal to generate a tag signal;

transmitting with the tag, the tag signal; and periodically enabling the tag to receive and transmit at times independent of any received first signal.

42. The method as claimed in claim 41, wherein the act of operating on the first signal to provide the second signal comprises:

mixing the first signal with a local oscillator signal to generate the second signal at a second frequency.

43. The method as claimed in claim 41, wherein the act of operating on the first signal to provide the second signal comprises:

delaying the first signal to provide the second signal.

44. The method as claimed in claim 41, further comprising an act of maintaining the tag in a low-power state between consecutive acts of transmitting the tag signal.

45. The method as claimed in claim 41, wherein the act of generating tag specific data comprises generating a unique identification code that uniquely identifies the tag.

46. The method as claimed in claim 45, further comprising acts of:

receiving a third signal; and modifying the unique identifying code in response to the third signal.

47. The method as claimed in claim 41, further comprising acts of:

simultaneously receiving at the tag, multiple first signals;

simultaneously generating with the tag, multiple tag signals corresponding to the first signals received.

48. The method as claimed in claim 41, wherein the act of generating tag-specific data, further comprises acts of:

deriving data from an object associated with the tag; and generating tag specific data comprising the data derived from the object associated with the tag.

49. The method as claimed in claim 41, wherein the act of generating tag-specific data, further comprises an act of generating tag specific data comprising data obtained from a person associated with the tag.

50. The method as claimed in claim 41 further comprising an act of transmitting the first signal.

51. The method as claimed in claim 50, wherein the act of transmitting the first signal further comprises:

transmitting a pseudonoise sequence on the first signal.

52. The method as claimed in claim 50, wherein act of transmitting the first signal further comprises:

transmitting a direct sequence spread spectrum signal.

53. The method as claimed in claim 41, wherein:

the act of receiving the first signal comprises an act of receiving at the tag a first signal having a center frequency substantially in a frequency range of 902–928 MHz; and the act of operating on the first signal to provide a second signal comprises an act of providing a second signal having a center frequency substantially in a range of 2400–2483 MHz.

54. The method as claimed in claim 41, wherein:

the act of receiving the first signal comprises an act of receiving at the tag a first signal having a center frequency substantially in a frequency range of 902–928 MHz; and the act of operating on the first signal to provide a second signal comprises an act of providing a second signal having a center frequency substantially in a frequency range of 5345–5875 MHz.

55. The method as claimed in claim 41, wherein:

the act of receiving the first signal comprises an act of receiving at the tag a first signal having a center frequency substantially in a frequency range of 2400–2483 MHz; and the act of operating on the first signal to provide a second signal comprises an act of providing a second signal having a center frequency substantially in a frequency range of 5345–5875 MHz.

56. The method as claimed in claim 41, wherein:

the act of receiving the first signal comprises an act of receiving at the tag a first signal having a center frequency substantially in a frequency range of 2400–2483 MHz; and the act of operating on the first signal to provide a second signal comprises an act of providing a second signal having a center frequency substantially in a frequency range of 902–928 MHz.

57. The method as claimed in claim 41, wherein:

the act of receiving the first signal comprises an act of receiving at the tag a first signal having a center frequency substantially in a frequency range of 5345–5875 MHz; and the act of operating on the first signal to provide a second signal comprises an act of providing a second signal having a center frequency substantially in a frequency range of 2400–2483 MHz.

58. The method as claimed in claim 41, wherein:

the act of receiving the first signal comprises an act of receiving at the tag a first signal having a center frequency substantially in a frequency range of 5345–5875 MHz; and the act of operating on the first signal to provide a second signal comprises an act of providing a second signal having a center frequency substantially in a frequency range of 902–928 MHz.

59. A method for detecting a tag, comprising acts of:

receiving at a tag a first signal;

operating with the tag on the first signal to provide a second signal that can be discriminated from the first signal;

generating with the tag, tag-specific data;

modulating with the tag, the tag-specific data onto the second signal to generate a tag signal;

transmitting with the tag, the tag signal;

receiving the tag signal with a tag reader;

detecting a presence of the tag based on receipt of the tag signal at the tag reader; and wherein the tag is periodically enabled to receive and transmit at times independent of any received first signal.

60. The method as claimed in claim 59, further comprising an act of determining an identity of the tag from the tag-specific data encoded in the tag signal.

61. The method as claimed in claim 59, further comprising acts of receiving the tag signal with a plurality of antennas coupled to the tag reader; and determining a location of the tag with respect to the plurality of antennas.

62. The method as claimed in claim 61, further comprising acts of:

receiving the tag signal at three locations; and determining a location of the tag using triangulation techniques.

63. The method as claimed in claim 61, further comprising an act of determining a distance from the tag to each antenna of the plurality of antennas that receives the tag signal, based on a time of transmission of the tag signal and a time of reception of the tag signal at each antenna.

64. The method as claimed in claim 61, further comprising an act of providing the location of the tag to a user interface.

65. The method as claimed in claim 61, further comprising an act of modifying with the tag reader a piece of equipment coupled to the tag reader based on the location of the tag.

66. The method as claimed in claim 61, further comprising an act of placing the tag at a known location for performing a system calibration.

67. The method as claimed in claim 66, wherein the act of performing the system calibration comprises:

separating the received tag signal into inphase and quadrature components;

repeatedly correlating the inphase and quadrature components with a pseudonoise sequence;

determining a phase difference between successive correlations; and calibrating a tag clock based on the phase difference.

68. The method as claimed in claim 59, further comprising an act of determining from the received tag signal, a time at which the tag will next transmit a tag signal.

69. The method as claimed in claim 59, further comprising an act of obtaining information from the received tag signal.

70. The method as claimed in claim 67, further comprising an act of modifying a piece of equipment based on information obtained from the received tag signal.

71. The method as claimed in claim 67, further comprising an act of storing information obtained from the received tag signal.

* * * * *

UNITED STATES PATENT AND TRADEMARK OFFICE
CERTIFICATE OF CORRECTION

PATENT NO. : 6,483,427 B1
DATED : November 19, 2002
INVENTOR(S) : Werb

It is certified that error appears in the above-identified patent and that said Letters Patent is hereby corrected as shown below:

Column 13,
Line 10, change Formula 3 to read as follows:
-- Delay =Xor(N, BitRotate(UID, AND(N, $1111_2$)))     Formula 3 --

Column 22,
Lines 9 and 18, change "range of 5345-5875 MHz." to -- range of 5725-5875 MHz. --
Lines 32 and 41, change "5345-5875 MHz; and" to -- 5725-5875 MHz; and --

Signed and Sealed this

Twenty-third Day of September, 2003

JAMES E. ROGAN
*Director of the United States Patent and Trademark Office*